Jan. 12, 1937.  B. L. GREEN  2,067,184
AUTOMATIC MEANS FOR SETTING TYPE AND THE LIKE
Filed Feb. 20, 1931  14 Sheets-Sheet 1

INVENTOR:
BUFORD L. GREEN
BY
ATTORNEY.

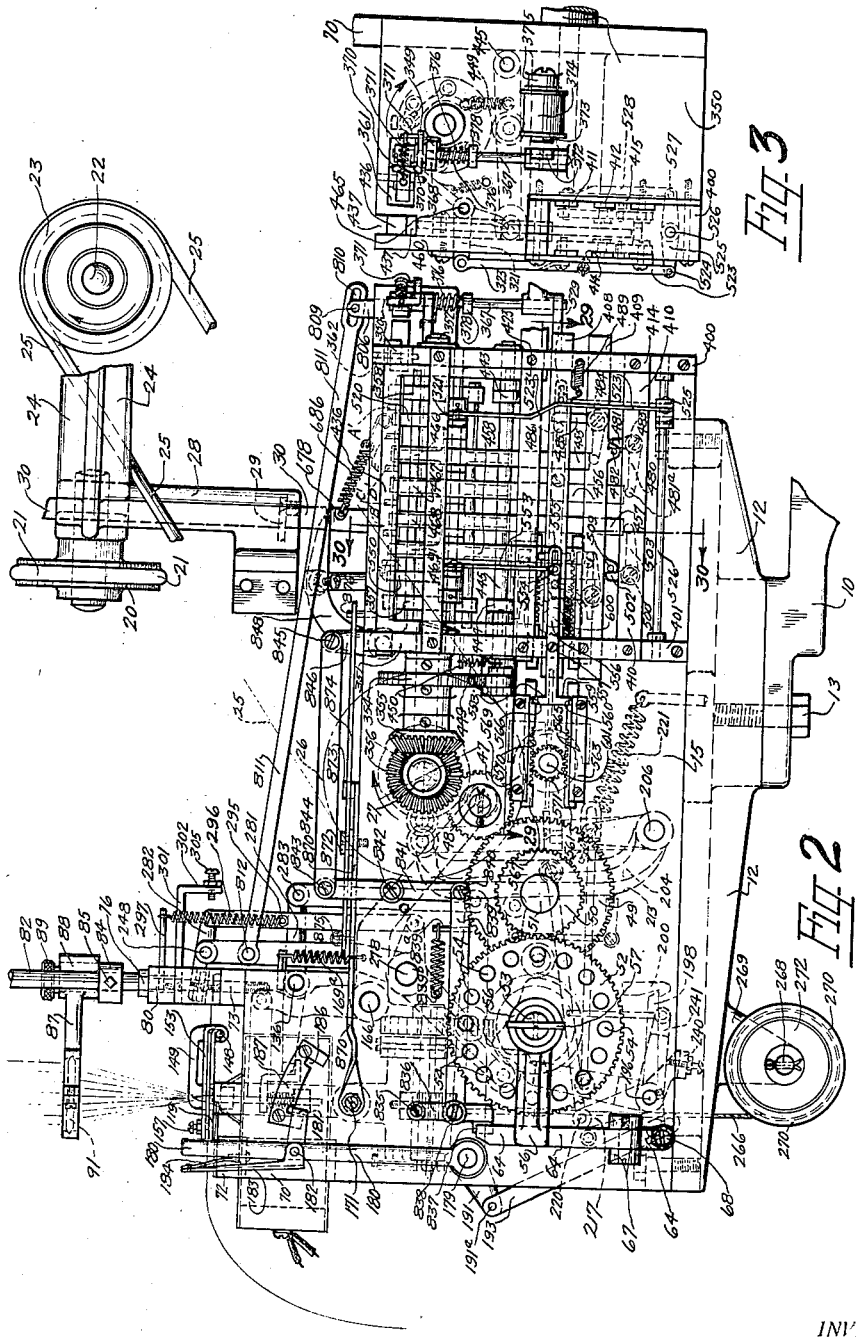

Jan. 12, 1937.  B. L. GREEN  2,067,184
AUTOMATIC MEANS FOR SETTING TYPE AND THE LIKE
Filed Feb. 20, 1931  14 Sheets-Sheet 3
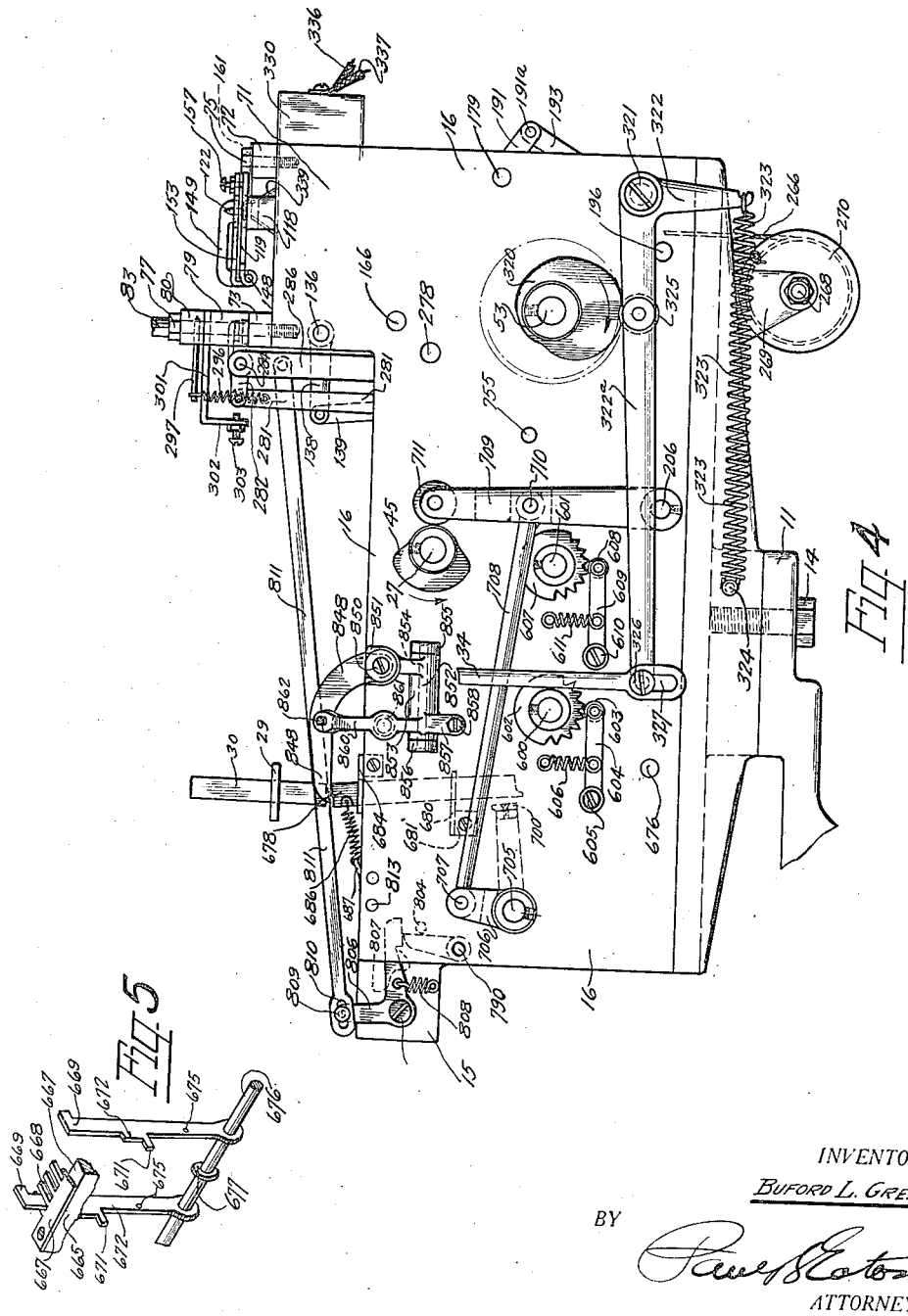
INVENTOR:
BUFORD L. GREEN
BY
ATTORNEY.

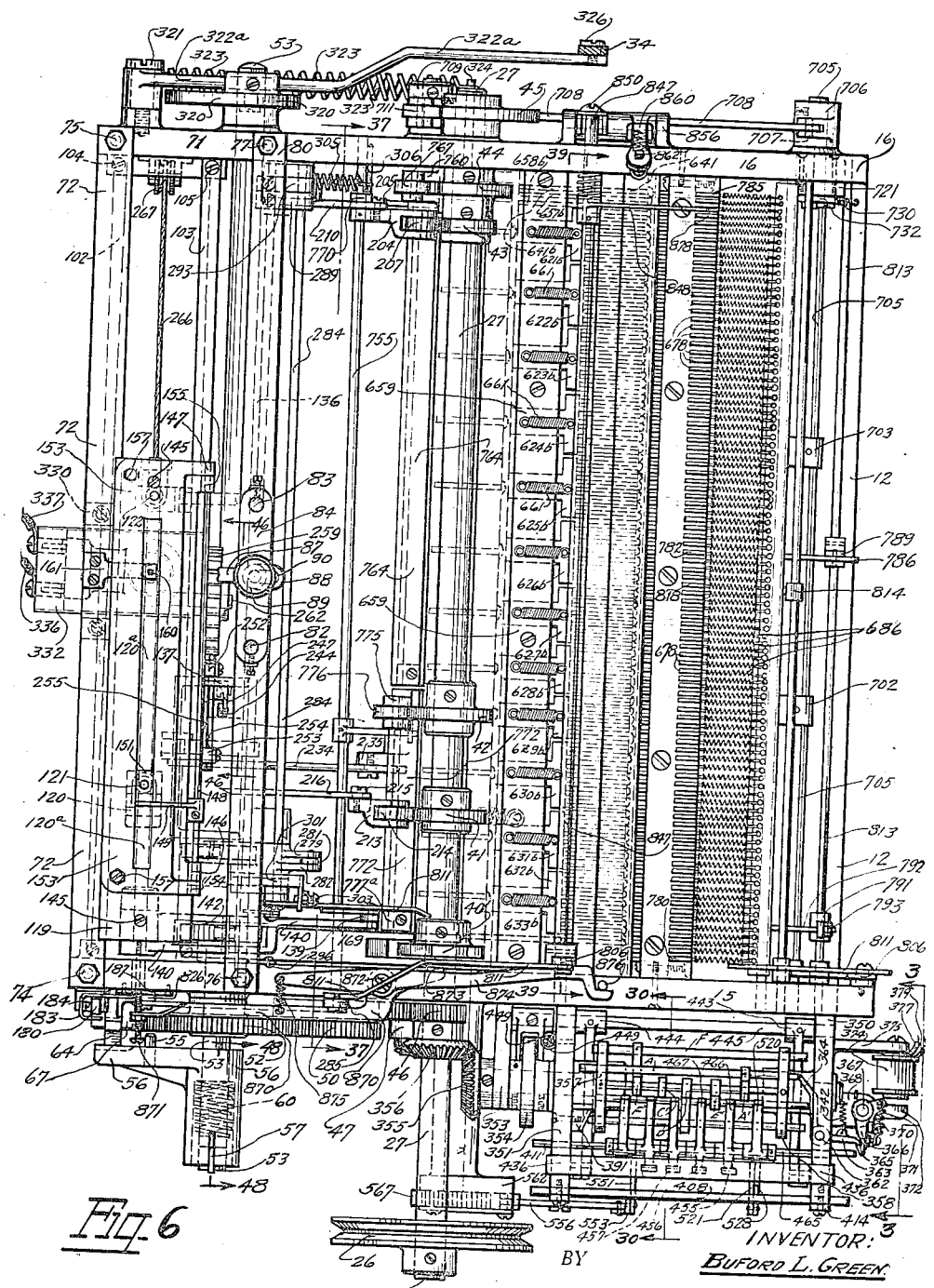

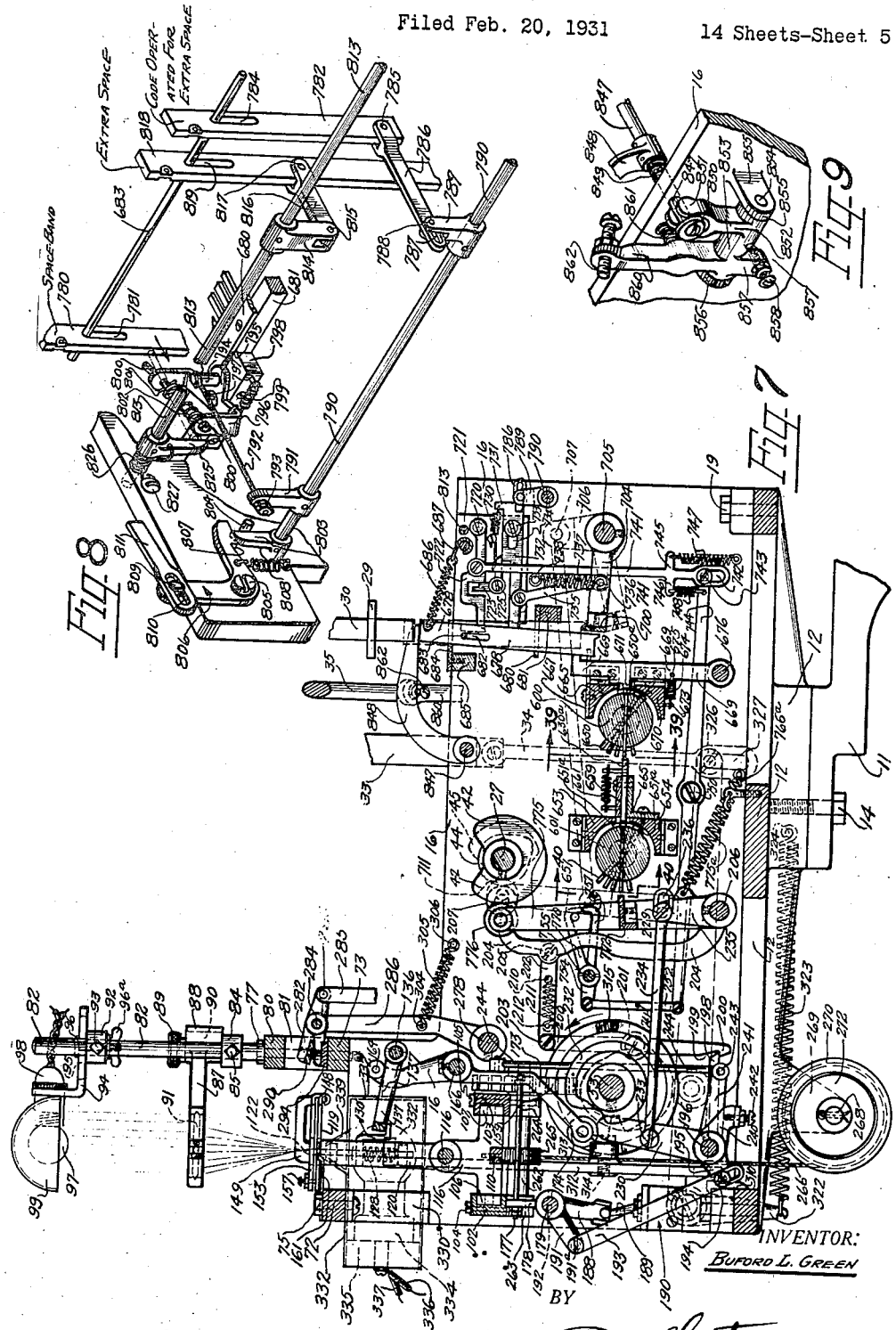

Jan. 12, 1937. B. L. GREEN 2,067,184
AUTOMATIC MEANS FOR SETTING TYPE AND THE LIKE
Filed Feb. 20, 1931 14 Sheets-Sheet 6
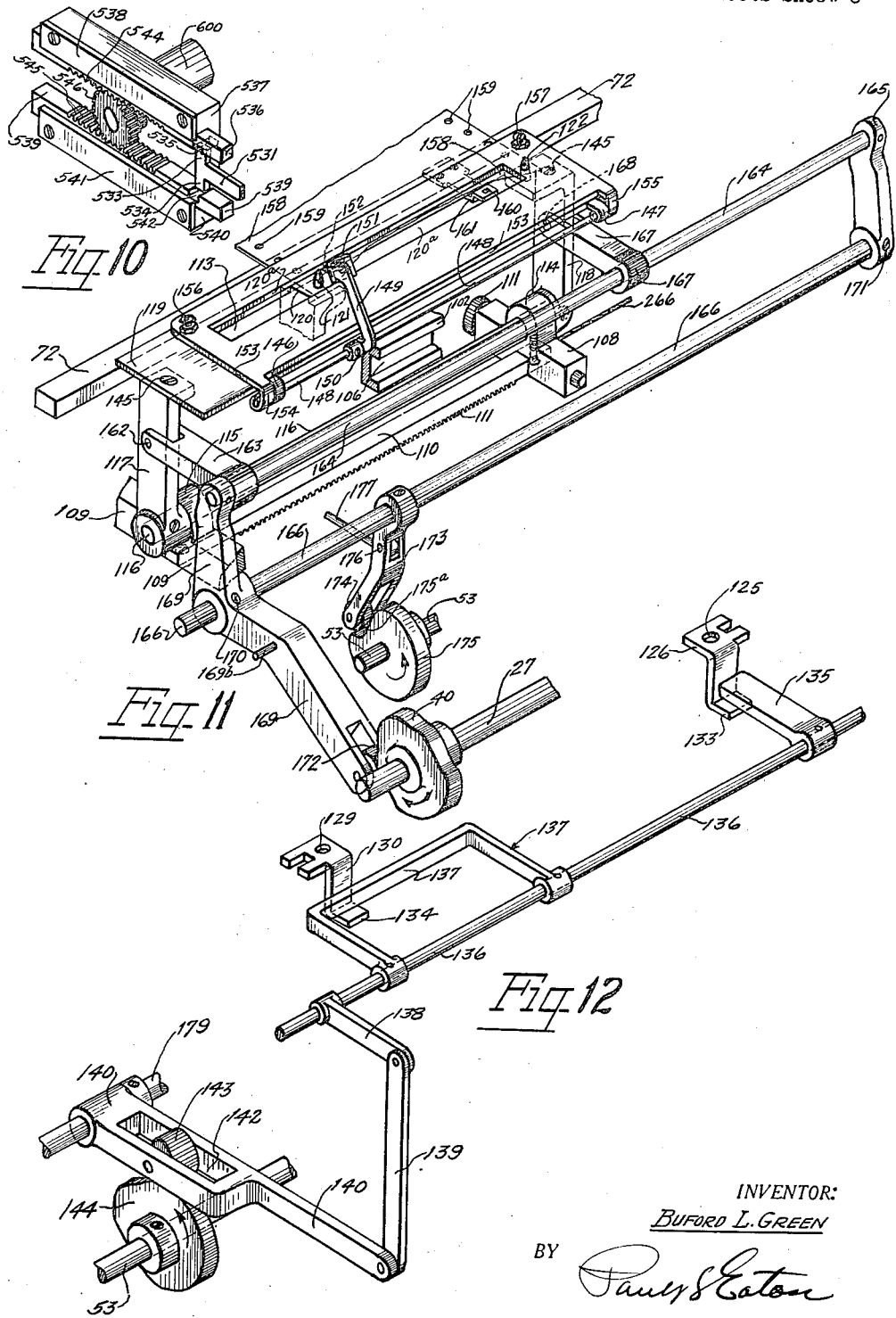
INVENTOR:
BUFORD L. GREEN
BY
ATTORNEY.

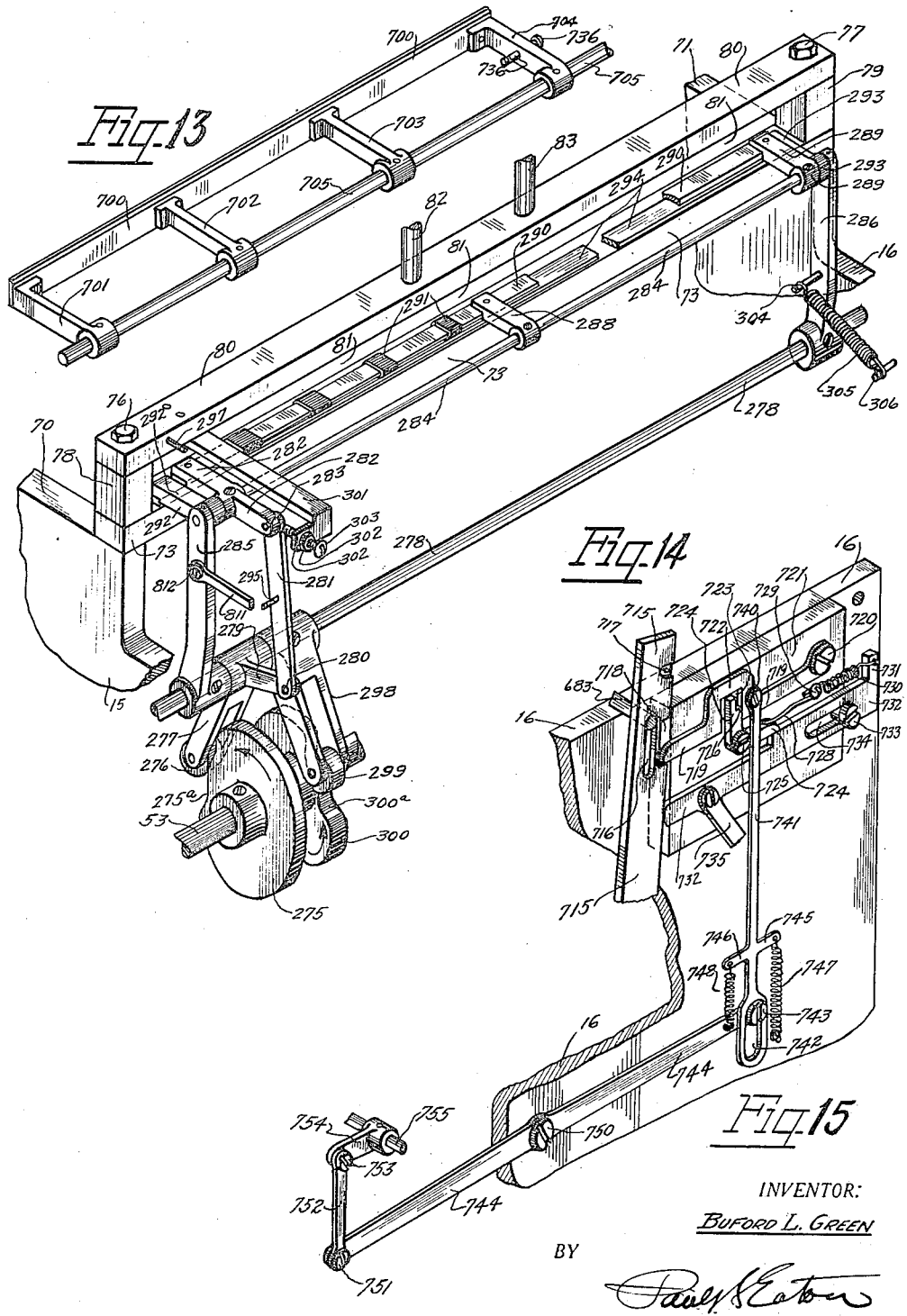

Jan. 12, 1937.  B. L. GREEN  2,067,184
AUTOMATIC MEANS FOR SETTING TYPE AND THE LIKE
Filed Feb. 20, 1931  14 Sheets-Sheet 8
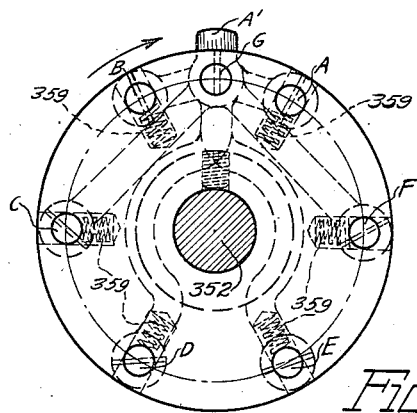
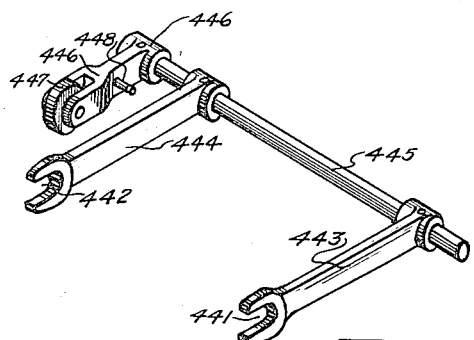
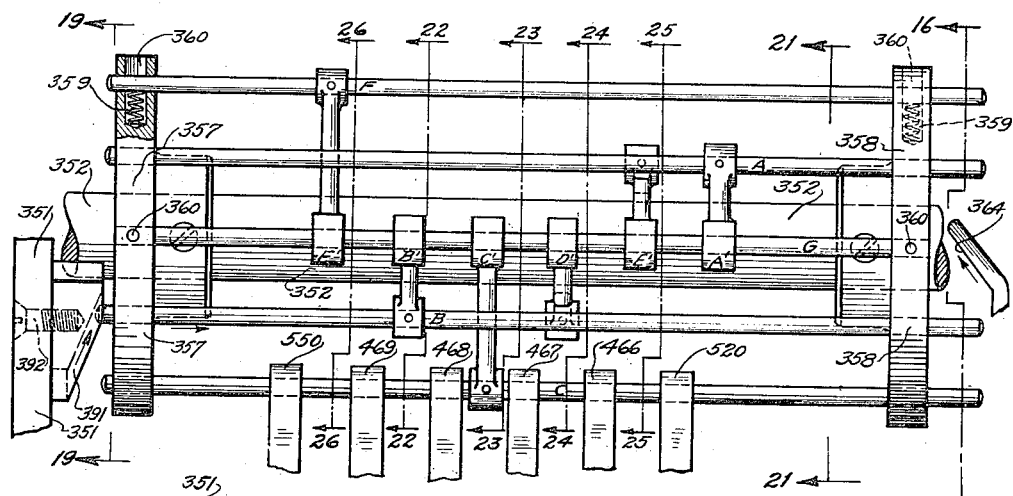
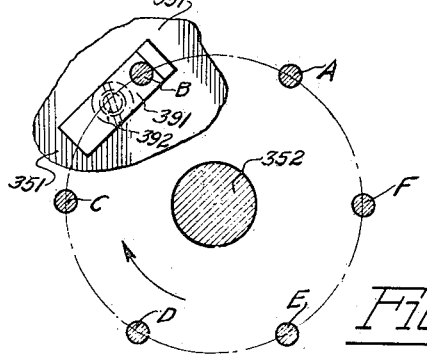
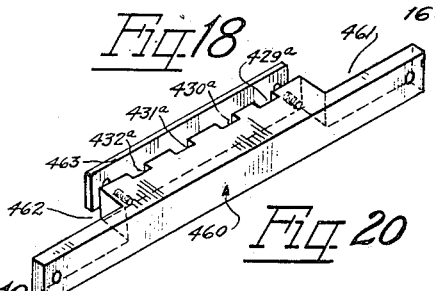
INVENTOR:
BUFORD L. GREEN
BY
ATTORNEY.

INVENTOR:
BUFORD L. GREEN.
BY
ATTORNEY.

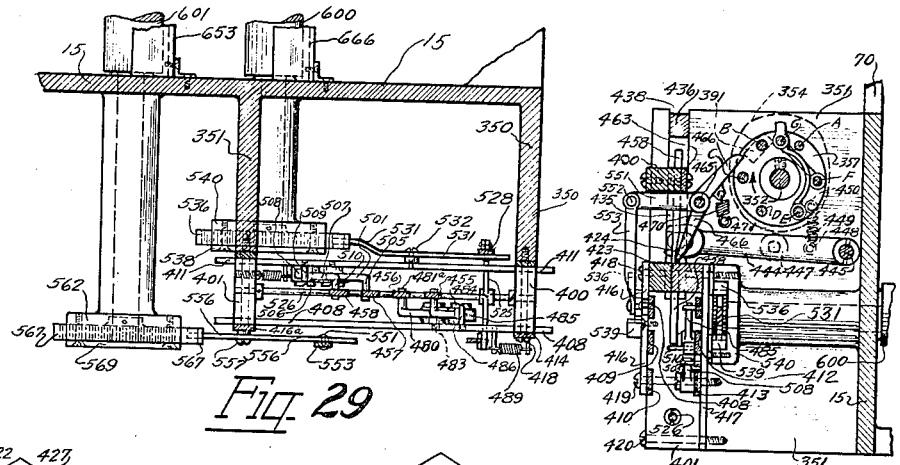

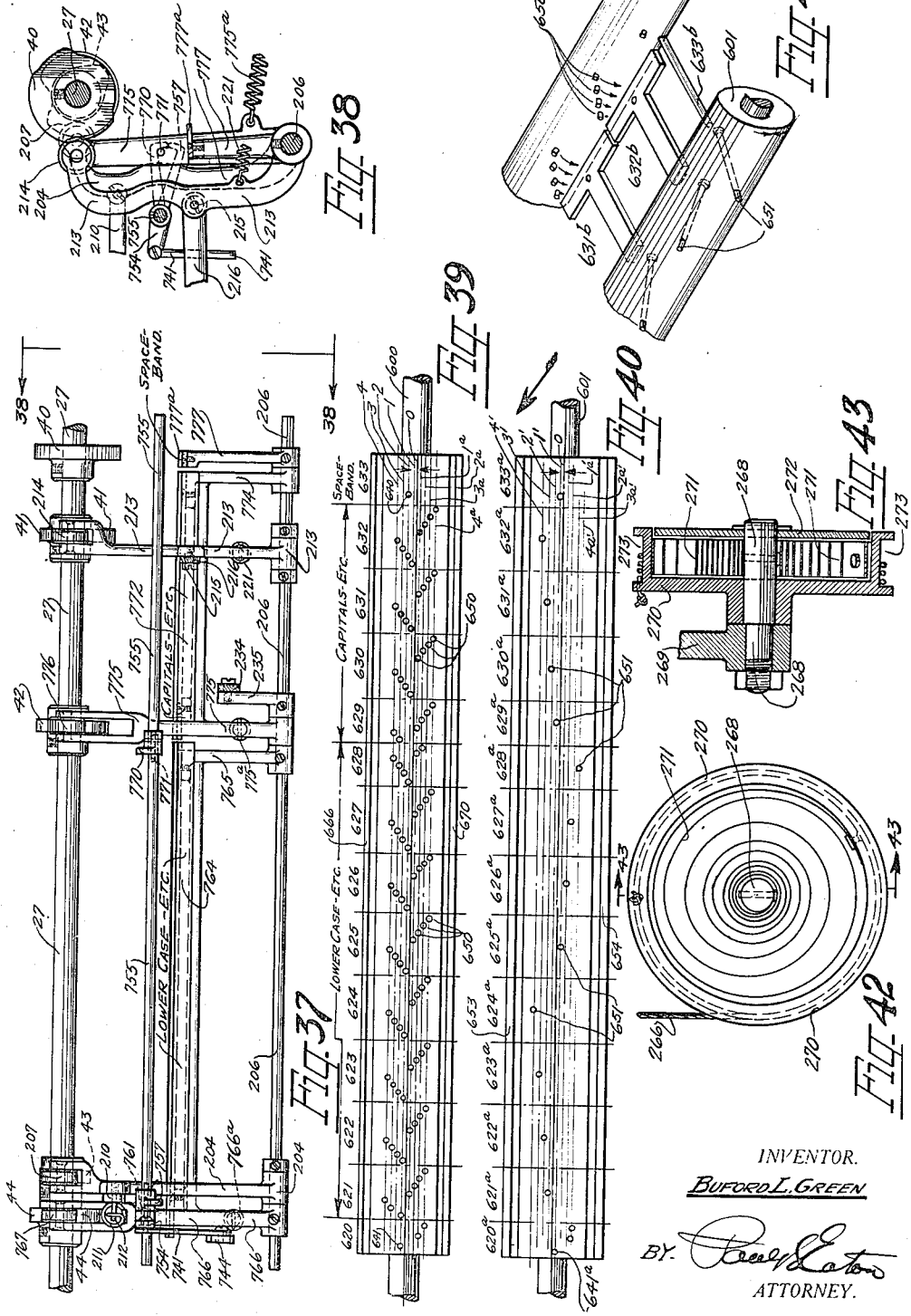

Jan. 12, 1937.  B. L. GREEN  2,067,184
AUTOMATIC MEANS FOR SETTING TYPE AND THE LIKE
Filed Feb. 20, 1931  14 Sheets-Sheet 12
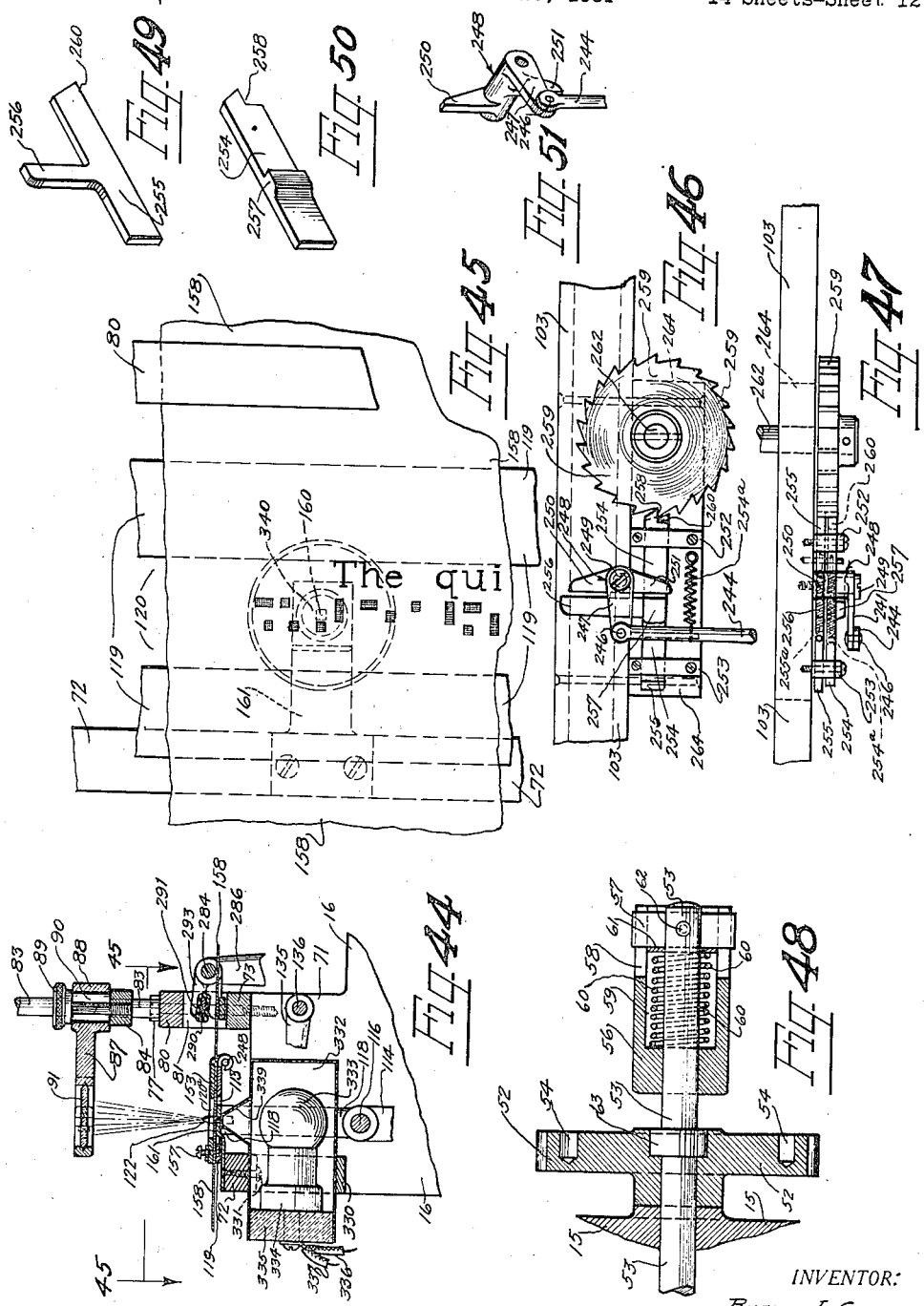
INVENTOR:
BUFORD L. GREEN
BY
ATTORNEY.

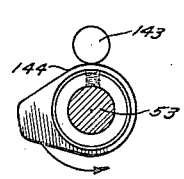
Fig. 52
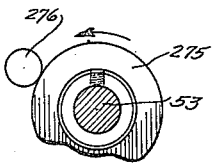
Fig. 53
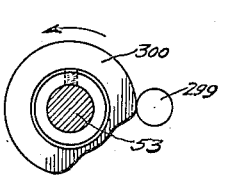
Fig. 54
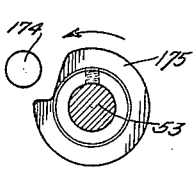
Fig. 55
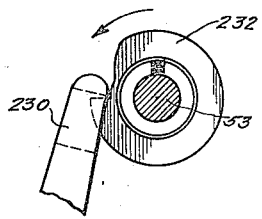
Fig. 56
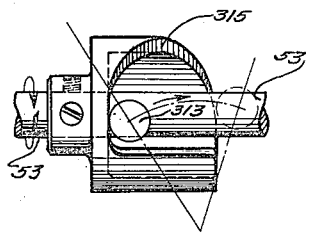
Fig. 57
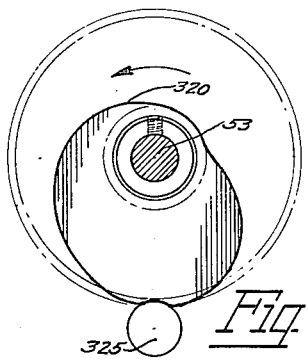
Fig. 58
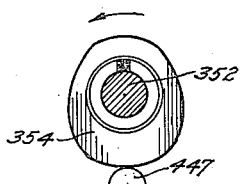
Fig. 59
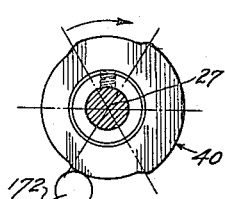
Fig. 60
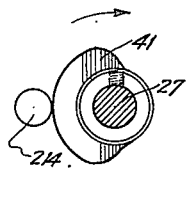
Fig. 61
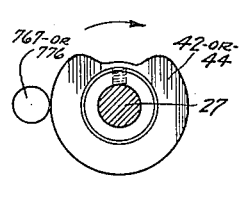
Fig. 62
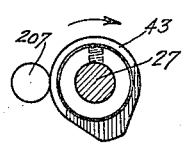
Fig. 63
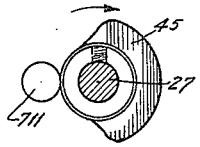
Fig. 64
INVENTOR.
BUFORD L. GREEN
BY
ATTORNEY.

Jan. 12, 1937.  B. L. GREEN  2,067,184
AUTOMATIC MEANS FOR SETTING TYPE AND THE LIKE
Filed Feb. 20, 1931   14 Sheets-Sheet 14
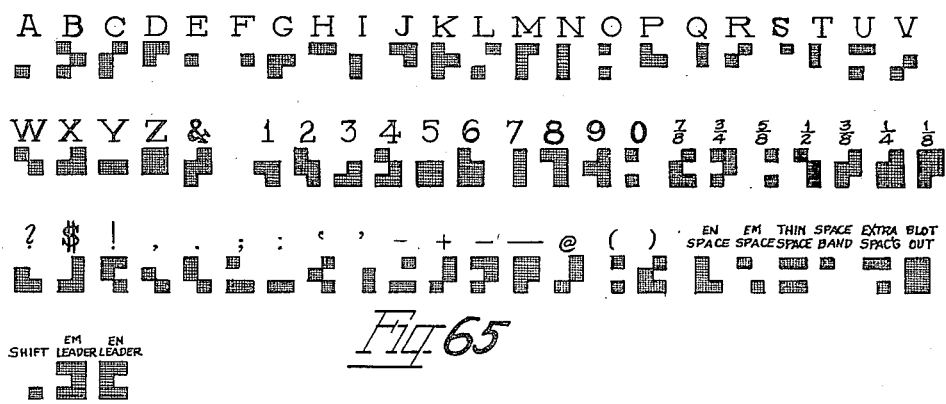
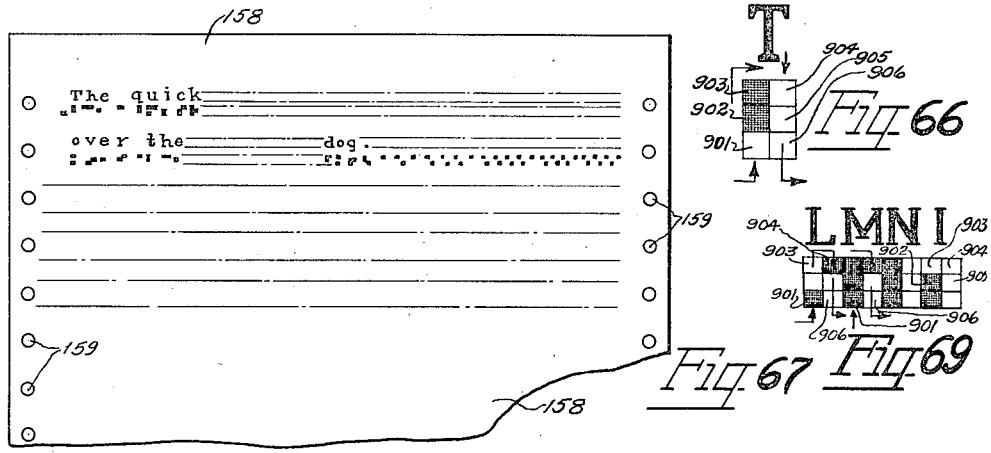
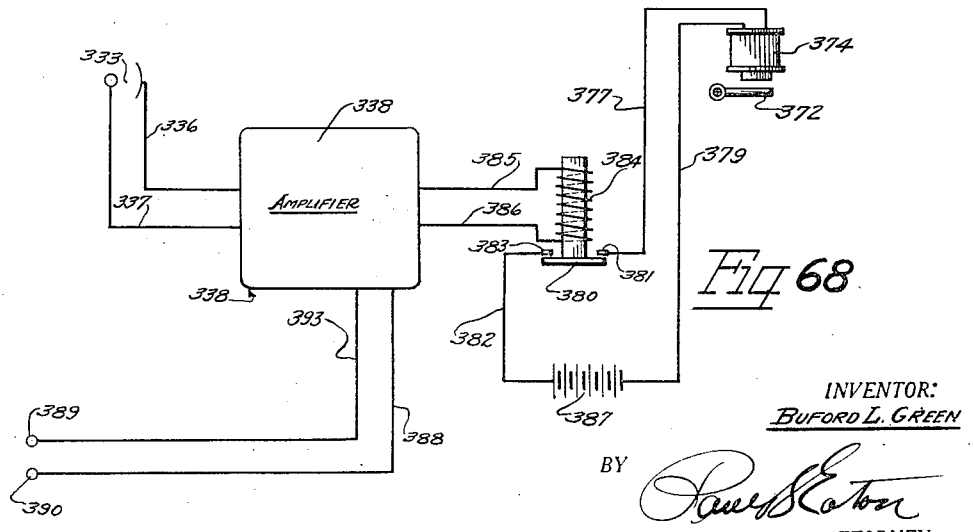
INVENTOR:
BUFORD L. GREEN
BY
ATTORNEY.

Patented Jan. 12, 1937

2,067,184

UNITED STATES PATENT OFFICE 2,067,184

AUTOMATIC MEANS FOR SETTING TYPE AND THE LIKE

Buford L. Green, Charlotte, N. C., assignor to Semagraph Company, Dover, Del., a corporation of Delaware Application February 20, 1931, Serial No. 517,171

113 Claims. (Cl. 199—18)

This invention relates to means for automatically setting type in a typesetting machine, and more especially to the employment of a machine adapted to be driven by a typesetting machine or driven separately and using a control sheet which may be prepared by a reporter or other persons on a special typewriter such as is described in my copending patent application, Serial Number 426,854, and having thereon a plurality of code characters, each code character comprising a plurality of cell controls. This control sheet is adapted to be later transferred to the mechanism hereinafter described whereby the typesetting operation will be automatically performed without the necessity of the operation of the keyboard of the typesetting machine by an operator as the mechanism hereinafter described is adapted to be installed instead of the manually operated keyboard as now occurs on a typesetting machine.

Another object of my invention is to provide a special mechanism adapted to be associated with a typesetting machine and to operate therewith and to receive a control sheet having imperforate code characters thereon with each code character usually comprising a plurality of cell controls, and this control sheet can be transferred to any desired place whether distant or near, and by actual bodily transfer or by television, or by an electric typewriter operated by a circuit between distant points, and can then be placed in the mechanism hereinafter described associated with a typesetting machine to automatically set the type therein.

Another object of my invention is to provide a mechanism adapted to be associated with a typesetting machine for automatically setting the type therein from a control sheet which control sheet may be written out by a reporter or typist on a typewriter having special type bars thereon in association with the legible character, a code character comprising a plurality of cell controls so that the typist can write out the report and at the same time write the code characters in association therewith, and this control sheet can then be transferred to the mechanism hereinafter described for automatically setting the type therein, although I desire it to be understood that if this control sheet is prepared in any other suitable manner wherein the legible characters are not necessary to be shown in connection with the code characters, the legible characters may be dispensed with as they perform no effect on the apparatus associated with the typesetting machine, but merely serve as a check to anyone proof-reading the control sheet to see that the proper characters appear on the control sheet.

Another object of my invention is to provide a mechanism adapted to be associated with a typesetting machine and being adapted to receive a control sheet having code characters thereon for automatically operating the typesetting machine to set the type therein comprising light sensitive means adapted to successively scan the cell controls in each code character to automatically operate the typesetting machine to set the type therein.

Another object of this invention is to provide means adapted to be associated with and may be driven by a typesetting machine whereby the type will be automatically set in the machine from a suitable control sheet.

Another object of this invention is to provide a machine which is adapted to be attached to a typesetting machine and which may be driven thereby or may be driven independently and to be operated by a control sheet having cell control characters thereon with a photo-electric or light actuated cell mechanism for successively scanning the cell control portions on the control sheet for automatically setting the type in the typesetting machine, and means are provided for automatic operation of this machine whereby when a complete line of code matter has been scanned and the type set therefor, the mechanism will return to a new line position and the lines of code matter will be successively scanned to set up a combination of elements for each code character on the control sheet for selectively operating the key rods for selectively setting the type in the typesetting machine.

I am aware that heretofore certain mechanisms have been employed using a perforated tape to cause the typesetting machine to be operated therefrom, and also other attempts have been made at operating a printer or typesetting machine from an imperforate control sheet, but so far as I am aware, I believe that the use of an imperforate control sheet having a plurality of cell controls for each character of the typesetting machine adapted to be successively scanned by a light sensitive cell for automatic operation of the typesetting machine is my invention, and it is an object of this invention to provide means to automatically set the type in a typesetting machine by the successive scanning of cell controls in a code character to automatically set a particular letter or character in a typesetting machine.

Some of the objects of the invention having been stated, other objects will appear as the description proceeds when taken in connection with the accompanying drawings, in which—

Figure 2 is an end elevation looking from the right hand end of Figure 1;

Figure 3 is an end elevation of selector mechanism looking from along the line 3—3 in Figure 6.

Figure 4 is an end elevation of the device looking from the left hand end of Figure 1, omitting parts of the type setting machine;

Figure 5 is an isometric view of a portion of the oscillating members shown in the lower right hand portion of Figure 7 for pushing the key rod lifters and similar members in the path of the oscillating member which raises them.

Figure 6 is a plan view of the machine looking down on the machine from a point at the right hand of Figure 1;

Figure 7 is a cross-sectional view taken along the line 7—7 in Figure 1;

Figure 8 is an isometric view of the mechanism for placing an extra space along-side the regular space band in a line.

Figure 9 is an isometric view of the mechanism shown in the upper left central portion of Figure 4 which is adapted to be engaged by the line delivery carriage lever of the typesetting machine while in normal position to cause the carriage mechanism to return to starting position;

Figure 10 is an isometric view of one of the racks and pinion associated with each of the selector pin shafts which racks are also shown in the central portion of Figure 2;

Figure 11 is an isometric view of the means for rocking the carriage mechanism;

Figure 12 is an isometric view of the mechanism for releasing the pins from the perforations in the control sheet when a shifting occurs for a new line position.

Figure 13 is an isometric view of oscillating bar for raising the key rod lifters and similar parts;

Figure 14 is an isometric view of the mechanism for shifting the control sheet to a new line position;

Figure 15 is an isometric view of the mechanism for placing in operation the capital letter section of the mechanism, and locking out the lower case section;

Figure 16 is a view taken along the line 16—16 in Figure 18;

Figure 17 is an isometric view of the oscillating shaft and forked arms thereon for reciprocating the member shown in Figure 32 for returning the bars shown in Figure 34 to their normal position;

Figure 18 is a top plan view of the selector cylinder;

Figure 19 is a view taken along the line 19—19 of Figure 18 showing the cam for returning the slidable bars in Figure 18 to normal position;

Figure 20 is an isometric view of the upper guide bar in the selector mechanism in which the selector bars shown in Figure 34 have sliding movement;

Figure 29 is a cross sectional view taken along the line 29—29 in Figure 2;

Figure 30 is a vertical sectional view taken along the line 30—30 in Figure 2;

Figure 31 is an exploded isometric view of the lower support bar and associated parts for slidably supporting the selector bars and the means for returning the same to normal position;

Figure 32 is an isometric view of the means for returning the selector bars to normal position;

Figure 33 is an isometric view of the lower portion of the two rear selector bars and the two rear transversely movable bars for controlling the amount of rotation which is imparted to the individual selector pin shaft;

Figure 34 is an isometric view of one of the selector bars;

Figure 35 is an isometric view of one of the shifting levers for determining the direction of rotation to be imparted to the pin shafts;

Figure 36 is an isometric view of one of the latch levers adapted to be engaged by the cams on the selector cylinder for releasing the selector bars shown in Figure 34.

Figure 37 is a view taken along the line 37—37 in Figure 6 showing only the moving parts;

Figure 38 is an end view of Figure 37 taken along the line 38—38 in Figure 37;

Figure 39 is a side elevation of the individual selector pin shaft taken along the line 39—39 in Figure 7;

Figure 40 is a side elevation of the section selector pin shaft taken along the line 40—40 in Figure 7;

Figure 41 is an isometric view of the two pin shafts looking in the direction of the arrow at the right hand end of Figures 39 and 40 and showing both shafts which appear in Figures 39 and 40 with the section bars therebetween;

Figure 42 is a view of the tension drum for moving the carriage mechanism when allowed to do so by the escapement mechanism;

Figure 43 is a vertical sectional view taken along the line 43—43 in Figure 42.

Figure 44 is a cross-sectional view taken along the line 44—44 in Figure 1 showing the scanning mechanism for the control sheet;

Figure 45 is an enlarged plan view taken along the line 45—45 in Figure 44 and showing only the necessary parts;

Figure 46 is a view of the carriage escapement mechanism looking from the rear of the machine;

Figure 47 is a plan view of Figure 46;

Figure 48 is a longitudinal sectional view through the clutch mechanism, taken along the line 48—48 in Figure 6;

Figure 49 is an isometric view of one of the pawls for releasing the escapement wheel of the carriage mechanism shown in Figure 46;

Figure 50 is an isometric view of the other pawl for releasing the escapement wheel of the carriage mechanism;

Figure 51 is an isometric view of the oscillating member which operates pawls shown in Figures 49 and 50;

Figure 52 is a view of the cam 144 on the intermittent shaft 53 for removing the pins from the perforations in the control sheet when shifting to a new line position;

Figure 53 is a view of the cam 275 for releasing the control sheet gripping means;

Figure 54 is a view of the cam 300 on the intermittent shaft 53 for shifting the control sheet to a new line position;

Figure 55 is a view of the cam 175 on the intermittent shaft 53 for locking the carriage against oscillation while it is returning to initial position;

Figure 56 is a view of the cam 232 on the intermittent shaft 53 for locking the lower case mechanism and ratchet mechanism from operation, while the carriage is returning to initial position;

Figure 57 is a side elevation of the cam on the intermittent shaft for returning the carriage mechanism to initial starting position;

Figure 58 is a view of the cam 320 on the intermittent shaft for operating the assembler mechanism of the typesetting machine;

Figure 59 is a view of the cam on the axis 352 of the selector cylinder for oscillating the shaft 445 shown in Figure 17 for returning the selector bars to normal position;

Figure 60 is a view of the cam 40 on the main drive shaft 27 for rocking the carriage for the scanning operation;

Figure 61 is a view of the cam 41 on the main drive shaft 27 for operating the escapement mechanism for the carriage as shown in Figure 46;

Figure 62 is a view of one of the cams 42 or 44 for separately operating the oscillating bars which engages the pins in the section selector pin shaft 601;

Figure 63 is a view of the cam allowing the carriage to be oscillated and the oscillating mechanism to begin operation at a predetermined point;

Figure 64 is a view of the cam 45 on the main drive shaft 27 for operating the oscillating shaft 705 for raising the key rod lifters and similar parts;

Figure 65 is a view of the code for each character in a typesetting machine;

Figure 66 is an enlarged view of the code character for the capital letter "T";

Figure 67 is a view of a portion of a control sheet for use in the machine;

Figure 68 is a view showing the wiring diagram of the mechanism;

Figure 69 is a view showing the actual manner in which the cell controls should appear on the control sheet.

Figure 1:
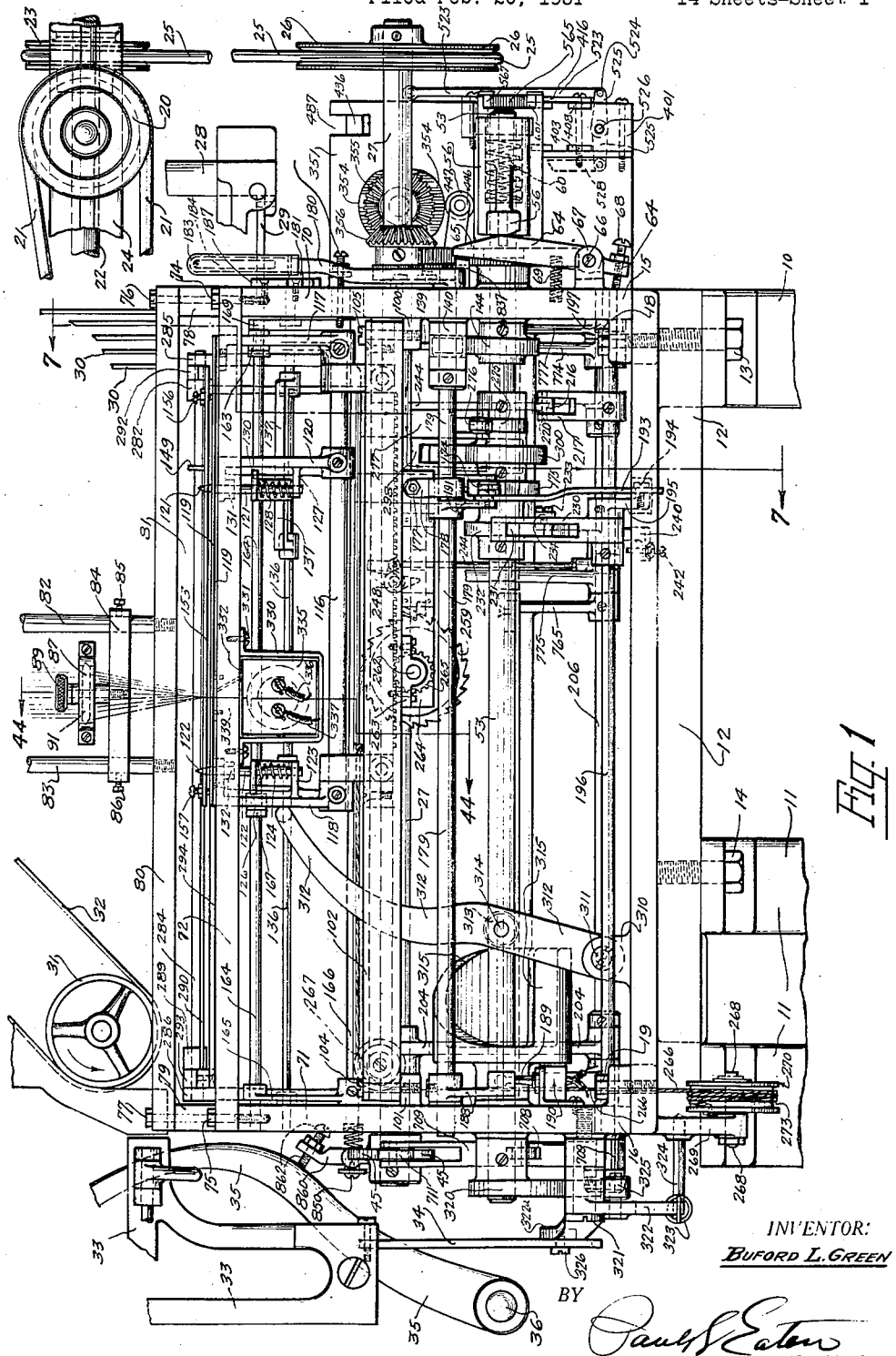
Figure 1 is a front elevation of the machine showing it attached to a typesetting machine and showing a small portion of the typesetting machine.
Figure 21:
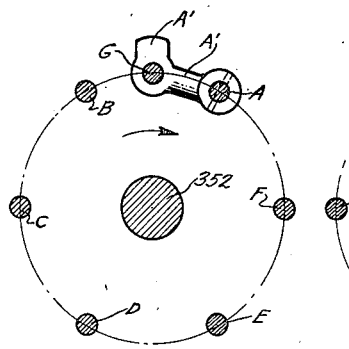
Figure 21 is a view taken along the line 21—21 of Figure 18 with only the proximate parts shown.
Figure 22:
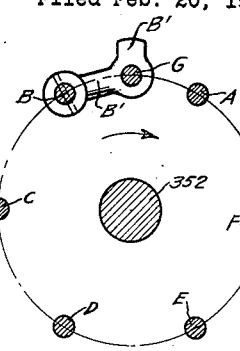
Figure 22 is a view taken along the line 22—22 in Figure 18 and showing only the proximate parts.
Figure 23:
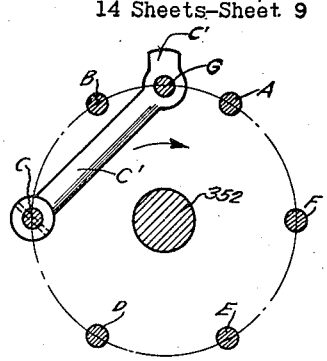
Figure 23 is a view taken along the line 23—23 of Figure 18 and showing only the proximate parts.
Figure 24:
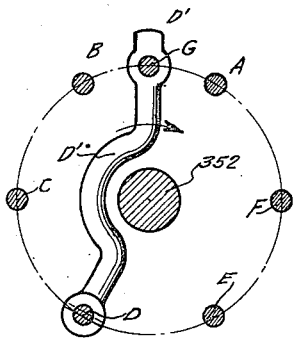
Figure 24 is a view taken along the line 24—24 of Figure 18 and showing only the proximate parts.
Figure 25:
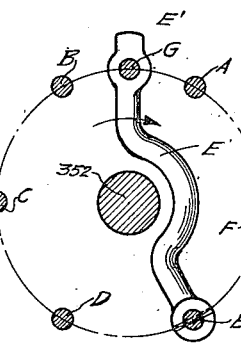
Figure 25 is a view taken along the line 25—25 in Figure 18 and showing only the proximate parts.
Figure 26:
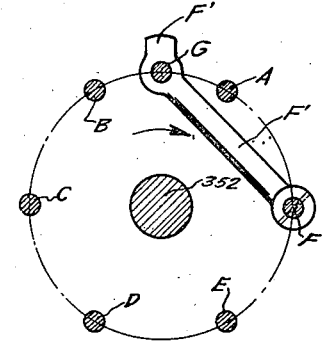
Figure 26 is a view taken along the line 26—26 of Figure 18 and showing only proximate parts.

Referring more specifically to the drawings, it will be seen by observing Figure 1 that my automatic typesetting mechanism is adapted to be placed in the same position as the manually operated key board is normally placed in a conventional line casting machine.

In Figure 1 is shown the supports 10 and 11 of the typesetting machine frame, on which the base plate 12 of my mechanism is adapted to be mounted and secured in place by bolts 13 and 14, and secured to this base plate at each end thereof are the end plates 15 and 16 which are secured in position on the base plate 12 by any suitable means such as bolts 17 and 18 and 19.

In order to clearly show how my mechanism is associated with a typesetting machine, I show the assembler drive pulley 20 with belt 21 thereon and in the rear of this mechanism is the intermediate drive shaft 22 which is mounted in frame 24 and has secured thereon pulley 23 on which belt 25 is mounted, said belt being also mounted on a pulley 26 which is secured on the main drive shaft 27 of my mechanism.

Also shown in Figure 1 is a portion 28 of the frame of the typesetting machine to which is secured support 29, which is adapted to support the lower end of the conventional key rods 30 in a conventional manner which normally is that of having a portion cut out of the lower end portion so that a portion thereof will project below the support 29 and the shoulder thereon rest on this support 29. The conventional key rods are adapted to be operated automatically by my mechanism.

Also in Figure 1 is shown the assembler pulley 31 with belt 32 thereon which is driven by the pulley to deliver the matrices to the assembler 33 which is a conventional assembler. This assembler has secured to the lower end thereof in a pivotal manner a link 34 which is connected to the assembler lifting mechanism which will be later described.

Also in Figure 1 is shown the line delivery carriage lever 35 which is fixedly mounted on shaft 36 which is conventional and is adapted to cooperate with the clutch mechanism which will be later described.

Main drive shaft 27 (see Fig. 6) has mounted thereon a cam 40, and along-side this cam is another cam 41 and further out on the main drive shaft is another cam 42, and further along the main drive shaft is another cam 43, and along-side this is another cam 44 which is in close proximity to the end plate 16, and on the outside of end plate 16, and near the end of the main drive shaft which projects outwardly from the exterior from the end plate 16 is another cam 45.

The main drive shaft is shown as being constantly driven as above described by the typesetting machine, though it may be driven from a separate source of power, and the cooperation of the various cams previously described in conjunction with the mechanism will be taken up separately in conjunction with the mechanism which is operated by each of the respective cams.

Fixedly mounted on main drive shaft 27 is a spur gear 46 which meshes with an idler spur gear 47 mounted on stud bolt 48, and this gear 47 meshes with a spur gear 49 which has integral therewith a pinion 50 (see Fig. 2). This combined gear 49 and 50 is rotatably mounted on stud shaft 51, and pinion 50 meshes with a spur gear 52 which is loosely mounted on an intermittently driven shaft 53. Gear 52 has a plurality of concentric holes 54 therein which are adapted to be engaged by a pin 55 in clutch arm 56 which is slidably mounted on intermittently driven shaft 53 by means of a key 57 which is fixedly mounted in shaft 53 and fits into opposed slots 58 in the hub portion of clutch arm 56. The hub portion of clutch arm 56 has a circular cavity 59 therein large enough to receive a compression spring 60, and a washer 61 is mounted between the compression spring 60 and the key 57 and fits loosely in open end of cavity 59. Key 57 is secured in the shaft by means of a pin 62.

The shaft 53 has a collar 63 integral therewith which fits into a suitable enlarged circular cavity in the hub portion of spur gear 52 (see Fig. 48). Clutch arm 56 is normally held away from spur gear 52 so as to prevent the pin 55 from engaging one of the holes in the spur gear 52 by means of a lever 64 which has a sloping surface 65 on the end portion thereof, and the other end of this lever 64 is pivotally mounted intermediate its ends as at 66 in a projection 67 which projects from the end plate 15.

A set screw 68 is mounted in the lower end of lever 64 below the pivot point thereof to limit the outward swinging movement of said lever, and a compression spring 69 is mounted between member 64 and the end plate 15 to normally force said lever away from said end plate and into engagement with the clutch arm 56. End plates 15 and 16 have upwardly projecting portions 70 and 71 near the front of the device (see Figs. 1 and 2) for supporting the carriage mechanism and the scanning mechanism associated therewith. Secured on top of the projections 70 and 71 are bars 72 and 73, the bar 72 being secured by any suitable means such as cap screws 74 and 75. Bar 73 is likewise secured in position by any suitable means such as cap screws 76 and 77, and spacer blocks 78 and 79 are also penetrated by these cap screws, and on top of these spacer blocks is likewise secured by the said cap screws 76 and 77 a bar 80, said cap screws passing through bar 73 and spacer blocks 78 and 79 and the top bar 80, leaving a space 81 between the two bars.

Secured on bar 80 are the vertically disposed support members 82 and 83 which are spaced apart from each other, and adjustably mounted on these members 82 and 83 is a cross bar 84 which is secured in position by any suitable means such as set screws 85 and 86, and pivotally and adjustably mounted on member 84 is a lens bracket 87 which has a hub portion 88 penetrated by screw 89 which is threadably mounted in cross bar 84 so that the lens bracket can be adjusted. This lens bracket 87 has a slot 90 in the hub portion thereof which is penetrated by screw 89 so that the lens bracket 87 may be adjusted inwardly and outwardly with relation to member 84 for the securing of a proper position of the lens 91 therein, which lens 91 is mounted in the bracket 87 in any suitable manner.

Above the cross bar 84 is a similar upper cross bar 92 which is secured on the vertically disposed support members 82 and 83 by any suitable means such as set screws 93, and intermediate the ends of this upper cross bar 92 is secured a bracket 94 which has a slot 95 therein penetrated by a clamp bolt 96 having wing nut 96a thereon for adjusting the position of the bracket to regulate the position of a source of illumination such as an electric light bulb 97 which is mounted in a socket 98 which is secured in the bracket 94 and a shade and deflector 99 is secured over this source of illumination 97 for directing the rays of light downward against lens 91, (see Fig. 7).

End plate members 15 and 16 have inwardly projecting lugs 100 and 101 (see Figs. 1 and 6) and on top of these lugs are secured the carriage track bars 102 and 103 which are secured by any suitable means such as screws 104 for the front bar and screws 105 for the rear bar. These bars are spaced apart from each other and have in their proximate side portions the grooves or trackways 106 and 107 respectively, (see Figs. 1, 7 and 11). The carriage mechanism comprises a framework composed of members 108 and 109, joined together by a member 110 which has a rack 111 on the lower surface thereof. The member 108 has wheels 112 rotatably mounted on each end thereof and member 109 likewise has wheels 112 thereon, all of said four wheels 112 running in the grooves 106 and 107. Projecting upwardly from the top surface of members 108 and 109 are lugs 114 and 115 in which is loosely mounted a rocker shaft 116 which has secured on the outer ends thereof arms 117 and 118 which project upwardly and have secured thereto plate member 119 which has an elongated slot 113 therein through which pin 121 projects. Pin 122 projects through holes in one end of plate member 119 and also through a hole in pivoted lid member 153.

Pin 122 is loosely mounted in a lug 123 on arm 118 and has a compression spring 124 thereon, and this pin projects through a hole 125 in member 126, and is tightly secured in said hole 125. Pin 121 is loosely mounted in a lug 127 on arm 120 and has a compression spring 128 therearound. This pin passes through a hole 129 in member 130, and is tightly secured in said hole 129 and projects upwardly through the top of arm 120, which arm is adjustably secured on rocker shaft 116. The pin 121 has a collar 131 fixedly secured thereon to limit the upward motion of the pin with relation to the upper end of arm 120. Likewise, pin 122 has a collar 132 thereon to limit its upward motion with relation to arm 118. Arm 120 projects into slot 113 and the upper surface thereof is flush with the upper surface of copy support plate 119.

Members 125 and 130 which are fixedly secured on pins 121 and 122 project downwardly and have outward projections 133 and 134, (see Fig. 12). The projection 133 is adapted to be engaged by an arm 135 which is fixedly secured on an oscillating shaft 136, and a U-shaped member 137 is fixedly secured on shaft 136 and this is adapted to engage projection 134 at the same time arm 135 engages projection 133 to force the pins 121 and 122 downwardly out of the holes in the control sheet to release the control sheet when it is desired to shift same to a new line position. Arm 120 can be adjusted along shaft 116 to suit width of copy. Shaft 136 is loosely mounted in the end plate projections 70 and 71 and has an arm 138 secured thereon to which is pivotally secured a link 139 which in turn is pivotally secured to a cam lever 140 which is loosely secured on a control shaft 179 and has a slot 142 therein in which is mounted a roller 143 which roller, due to the action of gravity, is adapted to follow a cam 144 on intermittent drive shaft 53.

The plate 119 is secured to the free ends of arms 117 and 118 by means of suitable screws such as 145, (see Figs. 1 and 11). From the rear edge of copy support plate 119, lugs 146 and 147 project, in which is fixedly secured a shaft 148, on which is fixedly secured an arm 149 which arm can be adjusted along said shaft by means of a set screw 150. The arm 149 has an enlarged portion 151 on the free end thereof with a cavity 152 in the lower surface thereof which is adapted to fit over pin 121 closely enough to allow the control sheet to pass between copy support plate and cover plate 153 when shifting to a new line position (see Figs. 1 and 11). Arm 149 is shown in raised position in Figure 11 for clearness as its position is that shown in Figure 1.

Rotatably secured on shaft 148 (see Fig. 11) is a lid member 153 which has curled portions 154 and 155 integral therewith and passing around shaft 148 so that lid member 153 may be raised upwardly when desired, and this lid member is spaced from copy support plate 119 both at the front and rear portions thereof and is limited in its approach to plate 119 by means of set screws 156 and 157. This lid member 153 has a slot 120a therein coinciding with slot 113 in plate 119 and through these two slots the scanning operation is performed on a control sheet 158 which is shown in position in Figure 11, and shown also in Figure 67. This control sheet has equally spaced perforations 159 in the marginal portions thereof into which the pins 121 and 122 are adapted to fit to insure the control sheet registering in such a manner that the line of code matter thereon will coincide with the path of the beam of light, passing from lens 91 through the slots and through a window 160 appearing in bracket 161 which bracket is secured on bar 72.

Arm 117 has pivotally secured thereto as at 162, a link 163 which is pivotally and slidably mounted on shaft 164 which shaft is fixedly secured in arm 165 secured on shaft 166 (see Fig. 11).

Similarly mounted as link 163 on shaft 164 is a link 167 which is pivotally secured as at 168 to member 118. On the other end of shaft 168 from that to which is secured member 165, is a bell crank lever 169 which bell crank lever is fixedly secured to shaft 166 by any suitable means such as a set screw 170. Member 165 is also secured on this shaft by any suitable means such as a set screw 171. Bell crank lever 169 on the other end thereof, has a roller 172 which is adapted to follow the cam 40 on the main drive shaft 27 by action of tension spring 169a attached to pin 169b so that by this means the carriage mechanism is given an oscillating movement which will be later described.

Shaft 166 has secured thereon an arm 173 which has a roller 174 in the free end thereof which is adapted to follow a cam 175 on intermittently driven shaft 53, the purpose of this cam 175 and arm 173 and associated parts being to lock the carriage out of oscillating position to prevent cam 40 from moving arm 169 to oscillate the carriage mechanism while the carriage is being returned to a position to start the scanning of a new line.

Intermittently driven shaft 53 has cam 175 thereon (see Fig. 11) which is so arranged that cam 175 has a cavity 175a therein so that while shaft 53 is in such a position as to cause cavity 175a to coincide with roller 174 it permits a free rocking motion of the carriage mechanism through bell crank lever 169 operated by cam 40, but when the shaft is in any other position to cause the roller 174 to be against the larger portion of the cam 175, then it causes roller 172 to be moved out of the path of cam 40 on constantly driven shaft 27 and, therefore, no rocking motion can be imparted to the carriage mechanism.

The arm 173 has pivotally secured thereto as at 176 a link 177 (see Fig. 11) which link is loosely connected to an arm 178 on a shaft 179 which shaft extends all the way across the machine and has its ends loosely mounted in end plates 15 and 16. The right hand of shaft 179 looking from the front of the machine, projects to the outside of end plate 15 and has secured thereto a lever 180 which has a pawl 181 pivotally secured as at 182 to a handle 183 which has secured thereto a leaf spring 184 for pressing the same into engagement with one of notches 186, as the case may be in a rack 187 fixed on the outer surface of end plate 15 for holding the lever in one of the two positions.

When this lever 180 is moved to cause the pawl to engage notch 186 in rack 187 the link 177 will allow roller 174 to engage cam 175. Also mounted on shaft 179 is an arm 188 which is adapted to engage a switch lever 189 of electric switch 190 which is mounted on the inner side wall of end plate 16 which is a conventional toggle switch and controls the circuit to the source of illumination 97. Also secured on shaft 179 by any suitable means such as pin 192, is an arm 191 and in the free end of this arm 191 is pivotally secured as at 191a, a link 193, the lower end of which link is pivotally secured as at 194 to an arm 195 which is fixedly secured on shaft 196.

Shaft 196 is loosely mounted in the end plates 15 and 16 and at its ends and on said shaft in close proximity to end plate 15 is secured a collar 197 to prevent endwise movement of the shaft. At the other end of this shaft in close proximity to the inner surface of end plate 16 is secured a lever 198 which projects backwardly and is adapted to engage a notch 199 in the lower end of member 200 which is pivotally secured intermediate its ends as at 201 on end plate 16.

The lever 198 is adapted to engage the notch 199 only when the carriage is being returned to a position for a new line or when the hand lever is in inoperative position to cause the scanning mechanism to start its scanning operation at a proper position to keep from splitting a code character in the reading operation.

To the upper end of pivoted member 200 is pivotally connected a link 202 as at 203, and the other end of this link is pivotally connected to a lever 204 as at 205, and the lower end of this lever is fixedly secured on a shaft 206 which is loosely mounted at its end portions in the inner surface of the end plates 15 and 16.

The upper end of lever 204 has a roller 207 therein (see Figs. 37 and 38) which is adapted to follow the cam 43 on the main drive shaft.

A pin 210 is secured in end plate 16, and to this is secured a tension spring 211, the other end of this tension spring being secured as at 212 to the link 202 in order to normally force the member 200 to the position shown in Figure 7, and also causes roller 207 to follow cam 43.

Shaft 206 has loosely mounted thereon an arm 213 with a roller 214 in the free end thereof which operates on cam 41 on main drive shaft 27. Pivotally secured to arm 213 as at 215 is a link 216 which projects forwardly and is pivotally secured in the free end of arm 217 which arm is fixedly secured on shaft 196.

In the free end of arm 217 is a pin 220 to which one end of link 216 is pivoted. Connected to arm 213 is a tension spring 221 which is mounted in a manner similar to spring 175a (see Fig. 7), the purpose of this being to normally press roller 214 against its cam 41.

Loosely secured on shaft 196 is an arm 230 which has a slot 231 therein which cam 232 is adapted to have movement so as to give a sharp action on this arm from said cam. Pivotally secured to one side of arm 230 as at 233 is a link 234 which projects forwardly and is connected in the free end of lever 235, which is fixed on shaft 206. The end of the link 234 which is connected to lever 235 is slotted as at 236 to allow relative movement between pin 229 on arm 235 and link 234 (see Figs. 1 and 7).

The lever 230 has the rearwardly and downwardly projecting portions 240 which has a set screw 242 therein which projects upwardly and is adapted to engage an arm 241 which is fixedly secured on shaft 196 which arm 241 has in the free end thereof a pin 243 on which pin is pivotally mounted a link 244 which projects upwardly and at its upper end is pivotally secured as at 246 to an arm 247 which is integral with a double acting rocking cam 248 (see Figs. 46–51 inclusive) which is pivotally mounted on bolt 249 which is fixedly secured in bar 103 and this double-acting cam has an upwardly projecting portion 250 and a downwardly projecting portion 251. Fixedly secured to the bar 103 are the guide members 252 and 253 in which are slidably mounted the escapement pawls 254 and 255. The one next to the bar being designated by the reference character 255, and the one located away from the bar is designated by reference character 254. Tension spring 254a and 255a hold their respective pawls against an escapement wheel 259.

The upper portion of cam 248 designated by 250, is adapted to have engagement with an upwardly projecting portion 256 on pawl 255 and the downwardly projecting portion 251 of the cam is adapted to have engagement with a projection 257 on pawl 254. Member 254 has the upper end portion thereof projecting farther out than the lower portion with a shoulder parallel to its longitudinal center at the lower edge of this projecting portion and this shoulder is half way the width of the member 254 so that when this member is pushed backward, it will allow the escapement wheel to move one half of a notch and rest against this projection, the face of which is indicated by reference character 258. The member 255 has an outwardly and downwardly sloping surface and the lower edge thereof is in a plane parallel to the lower edge of the member 254 and this is adapted to have engagement in one of the teeth on the escapement wheel and when this member 255 is slid backwardly it will allow the escapement wheel 259 to slip one half of a tooth and this tooth will rest against the shoulder 258 on member 254 and then when member 255 is pushed forward again the lower portion 251 of the cam 248 retracts member 254 and will allow the escapement wheel 259 to move another half notch and engage the lower surface 260 of member 255.

The escapement wheel 259 is rotatably mounted on a shaft 262 which is mounted in bearings 263 and 264 (see Figs. 1 and 7) on the lower side of bars 102 and 103, and on central portion of this shaft is secured a pinion 265 which is adapted to have engagement with the rack 111 in bar 110 for controlling the movement of the carriage mechanism. Member 108 has secured thereto a flexible member 266 which passes over a pulley 267 secured to the inner sidewall of member 16. This member 266 leads to the take-up mechanism which comprises a shaft 268 (see Figs. 1, 6, 42 and 43), secured in a downwardly projecting member 269 on base plate 12 and on this bolt is loosely mounted a casing 270 which has therein a coiled spring 271 which has one end thereof secured to the shaft 268, and the other end thereof secured to the interior of casing 270 and the end of this casing is closed by a disk 272, and the outer surface of casing 270 has a groove 273 therein in which the cord 266 is wound, thus imparting proper tension for moving the carriage when it is released by the escapement mechanism.

Fixedly secured on intermittently driven shaft 53 is a cam 275, and this cam is adapted to have engagement with a roller 276 in the end of arm 277 which is loosely secured on shaft 278 which shaft is rotatably mounted in the inside surface of the end plates 15 and 16 and integral with arm 277 is another arm 279 which has pivotally secured thereto as at 280 link 281 which projects upwardly and is pivotally secured to lever 282 as at 283 which lever is fixedly mounted on shaft 284 which shaft is pivotally secured in arms 285 and 286 which are fixedly secured at their other ends on shaft 278. Also fixedly secured on shaft 284 are arms 288 and 289 and on the free end of arms 282, 288 and 289 is fixedly secured a bar 290 on which are mounted friction members such as wide rubber bands 291 for gripping the paper for moving it to a new line position.

Loosely secured on shaft 284 are arms 292 and 293 which have secured on the free ends thereof a bar 294 which is adapted to have sliding movement on bar 73 and to be supported thereby. The control sheet passes between bars 290 and 294 and beneath shaft 284.

A pin 295 is secured in link 281 and has the lower end of a tension spring 296 secured thereto, and the upper end of this tension spring is secured to an extended pin 297 in bar 80 so as to cause roller 276 to follow cam 275 so that when roller 276 goes in cavity 275a of cam 275 that the friction members 291 will engage the control sheet because they will be allowed to be lowered against the control sheet and grip the same between members 291 and bar 294.

Fixedly secured on shaft 278 is arm 298 which has in the free end thereof a roller 299 which is adapted to follow cam 300 which has a cavity 300a therein where the roller 299 is adapted to rest when the mechanism has been moved to its extreme limit in pulling the control sheet to a new line position which is the position shown in Figure 14. Fixedly secured to the lower side of bar 80 is a bracket 301 which has an out-turned portion 302 in the free end thereof in which is mounted a set screw 303 which is adapted to press against link 281 when the paper has been pulled to a new line position to limit the pull imparted to the paper as shown in Figure 14.

On the most distant end of shaft 278 as shown in Figure 14 I have already described the arm 286. This arm 286 has a pin 304 secured therein to which is secured one end of a tension spring 305 and the other end of this spring is secured to a pin 306 which is mounted in the inner surface of end plate 16, (see Fig. 7), the purpose of this spring being to cause roller 299 to follow cam 300.

With the parts in the position shown in Figure 14 roller 276 is beginning to rise to a higher surface on a cam 275 and when this happens, this causes arm 279 to move downward with its link 281 and also it raises the bar 290 and releases gripper 291 from the paper and at the same time roller 299 is beginning to rise on cam 300 which moves arms 285 and 286 to return the gripping mechanism to a position where it can grip the paper and bring the control sheet to a new line position at the proper time.

Base plate 12 has a projection 310 on the upper surface thereof (see Fig. 1) and pivotally mounted in this projection as at 311 is an arm 312 which has a roller 313 mounted on pin 314 intermediate the ends thereof which roller is adapted to follow drum cam 315 fixedly mounted on intermittently driven shaft 53, the purpose of this arrangement being to cause the upper end of lever 312 to engage arm 118 of the carriage mechanism to cause the carriage mechanism to be returned to initial position ready for the scanning of a new line of code characters when the intermittently driven shaft 53 is operated to cause roller 313 to ride the surface of cam 315 to return the carriage mechanism to starting position. This return operation is perfected while shaft 53 makes a one half revolution and after this has taken place, the pins 121 and 122 are released from the control sheet and the gripping operation goes into effect to shift the control sheet to a new line position.

On the outside surface of end plate 16 there is fixedly secured on intermittent shaft 53 a cam 320 (see Fig. 4) and a stud bolt 321 is mounted in the outer surface of end plate 16 on which is pivotally mounted bell crank lever 322, the lower end of said bell crank lever having tension spring 323 secured thereto, and the other end of this tension spring is secured on a pin 324 mounted in the base plate 12. The bell crank lever 322 has an extended portion 322a in which is mounted a roller 325 which follows cam 320 and in the free end of portion 322a of lever 322 is mounted a stud bolt 326 which has movement in slot 327 in the lower end of link 34 which is connected to the assembler 33 and which has been previously described (see Fig. 1). The purpose of this arrangement being for cam 320 to lower the assembler mechanism and spring 323 to raise the assembler mechanism when permitted to do so by the cam on intermittent shaft 53. This raising of the assembler takes place while the carriage is being returned to a new line position.

Secured on the lower surface of bar 72 is a U-shaped bracket 330 (see Figs. 1 and 44) which is secured by means of screws 331 and this bracket secures in position a housing 332 which houses a light sensitive cell 333 which may be a photoelectric, selenium, or voltaic cell, which is mounted in socket 334 which is secured to insulating member 335 and wires 336 and 337 lead to opposite contact points of this cell which lead to amplifier 338 shown in Figure 68 which is a conventional amplifier and, therefore, a diagrammatic view of the same need not be shown. This casing 332 has an upwardly projecting conical portion 339 which has a small opening 340 through which rays of light are admitted to the cell when they are allowed to pass through the control sheet in the scanning operation.

Integral with sidewall 15 and projecting from the outer surface thereof are the vertically disposed plates 350 and 351 (see Figs. 1, 2, 3, 6, 16 to 20 and 29 to 36) which have rotatably mounted therein the shaft 352 which shaft is also supported in a projection 353 on end plate 15, and between member 351 and 353 is a cam 354 which is fixedly secured on shaft 352.

On one end of shaft 352 and in close proximity to projection 353 a miter gear 355 is secured which meshes with a similar miter gear of equal ratio indicated by reference character 356 which is fixedly mounted on main drive shaft 27, which imparts a continuous movement to shaft 352 in timed relation to shaft 27. The speed at which shaft 27 is driven can be regulated by the size of pulley 26 on shaft 27.

Shaft 352 has fixedly secured in spaced relation thereon disks 357 and 358 which have slidably mounted therein selector rods A, B, C, D, E and F, and these rods A, B, C, D, E and F are held frictionally by compression springs 359 which springs are mounted in a radial bore extending from the outside of the disk and presses against one side of each of the rods to hold them in adjusted position, and to prevent vibration from changing the position, said rods are adapted to be moved by the mechanism for setting up the combination which will be later described.

The rods A, B, C, D, E and F pass through disks 357 and 358 and project some distance from the outside surfaces of said disks, the purpose of which will be presently described.

Fixedly secured to the disks 357 and 358 by any suitable means such as pins 360 is a guide shaft G and on this shaft G all of the latch tripping lugs B′, C′, D′, E′, and direction control lugs A′ and F′ are loosely mounted, the other ends of these lugs being fixedly secured to their respective rod bearing a like reference character with the prime notation omitted. For example, lug A′ is fixedly secured on rod A and, likewise, throughout the other rods.

In vertically disposed plate 350 an opening 361 occurs and a pin 362 is vertically mounted in the plate 350, and pivotally mounted on this pin is a bell crank cam 363 which has a cam portion 364 which is held in the path of the rods A, B, C, D, E and F as they are moved by rotation of shaft 352 by weak tension spring 342. The friction imparted to the rods A, B, C, D, E and F is such that if any of these rods project in the path of cam portion 364 that they will throw the cam out of the path of these rods without moving same if the other end of lever 363 is not engaged by notch 365 in the end of dog 366 which dog is fixedly secured on a vertically disposed shaft 367 which shaft is mounted in projections 368 and 369 projecting from the plate 350.

The shaft 367 has fixedly secured thereon a lug 370 which projects in the path of dog 366 to force it into the path of bell crank cam 363, and a tension spring 371 is secured to this dog at one end, and the other end is secured to lug 349 for resiliently pulling the dog 366 out of engagement with bell crank cam 363 when magnet 374 is energized. The vertically disposed shaft 367 has an armature 372 fixedly secured thereon which projects outwardly and has its head portion, preferably, composed of soft iron, in alinement with core 373 of magnet 374, which magnet is secured on projection 375 projecting from plate 350.

The vertically disposed shaft 367 has a torsion spring 376 therearound which is secured at one end to a collar 378 fixedly secured to said shaft and the other end thereof is secured to projection 368, the purpose of this being to normally hold the armature away from core of magnet when said magnet is de-energized, and to allow cam lever 366 to engage bell crank cam member 363 to hold it in position whereby when it engages the ends of any of rods A, B, C, D, E and F that it will move the same to set up a combination.

Wires 377 and 379 are connected to the two ends of the wire of magnet 374 and wire 377 leads to a source of current either direct or alternating, indicated by reference character 387, and a wire 379 leads to one side of a relay 380, and the contact point associated with wire 377 is indicated by reference character 381, and from the other side of this relay 380, a wire 382 leads from contact point 383. The relay has a winding 384 associated therewith, and wires 385 and 386 lead from this relay to the amplifier 338 and from said amplifier wires 388 and 393 lead to a source of current, the contacts of said current being indicated by the points 389 and 390.

Secured to the plate 351 is a fixed cam 391 (see Fig. 19) which is secured by means of a screw 392, said cam being in the radial path traveled by rods A, B, C, D, E and F, and the purpose of this cam is to return said rods to normal position after they have been operated by cam portion 364 to set up a combination, and this return occurs after the lugs have performed the operation of moving certain members for controlling the typesetting, which will be presently described.

In the plates 350 and 351 and in the lower outer surface thereof, these plates are cut away and in plate 350 is secured member 400, and in plate 351 is secured member 401, said members being identical, and these members have transverse slots 402, 403 and 404, and on the opposite side thereof which fits next to the edge of members 350 and 351 are transverse slots 405, 406 and 407. In slots 402 and 403, which slots appear in both members 400 and 401, are slidably mounted bars 408 and 409, and in the bottom slots 404 a bar 410 is fixedly mounted.

In slots 405 and 406 bars 411 and 412 are slidably mounted, and a bar 413 which corresponds to bar 404 is fixedly mounted in the lower slots 407. These bars are held in position by means of vertically disposed plates 414 and 415 secured on opposite sides of member 400, and plates 416 and 417, which are identical to bars 414 and 415, are secured on opposite sides of member 401 to hold the slidable and fixed bars in position. Screws 418, 419 and 420 penetrate the members 400 and 401, and the screws 418 and 419 also penetrate vertically disposed bars 414, 415, 416 and 417 and screw 419 also penetrates the fixed bars 410 and 413, and the bars 414, 415, 416 and 417 project upwardly above the upper ends of members 400 and 401, and screws penetrate holes 421 and 422 in transversely disposed bars 423 and 424 which bars have coinciding vertically disposed slots in the proximate edges thereof, said slots being indicated by reference characters 425, 426, 427 and 428.

Bar 424 has vertically disposed slots in the inner side surface thereof indicated by reference characters 429, 430, 431, and 432. The member 433 has downwardly projecting portions 434 and 435 which have slidable engagement with slots 425, 426, 427 and 428, and these portions 434 and 435 have integral therewith at their top or upper ends, the horizontal portion 436 which is adapted to return the selector bars to normal position, which selector bars will be presently described. The member 436 projects outwardly from the vertical planes occupied by the outside surface of portions 434 and 435 and these outwardly projecting portions have slidable engagement in slots 437 and 438 in plates 350 and 351.

The portions 434 and 435 have on the proximate surfaces thereof rollers 439 and 440 which fit into forks 441 and 442 in levers 443 and 444 which are fixedly secured on shaft 445 which shaft is rockably mounted at one end in plate 350 and penetrates the plate 351 and on the outer end thereof has fixedly secured a lever 446 in the free end of which is a roller 447 which is adapted to follow cam 354 on shaft 352. The lever 446 has a pin 448 therein to which is secured the lower end of a tension spring 449, the upper end of which tension spring is secured to a pin 450 secured in the outer surface of sidewall portion 351, the purpose of this spring being to cause roller 447 to follow cam 354 at all times and to impart an up and down motion to member 433 and associated parts.

In notches 429 to 432 inclusive selector bars 455, 456, 457 and 458 are slidably mounted (see Figs. 30 and 34) and each of these selector bars has a notch 458a in the side surface thereof which is disposed next to the selector cylinder in which rods A, B, C, D, E, and F are mounted, and which has already been described. Secured between the plates 350 and 351 at the outer edge thereof is an upper guide bar 460 (see Fig. 20) which guide bar has spaces 461 and 462. This member 460 is secured on the outer edge of plates 350 and 351 near the upper portion thereof and projects inwardly and has slots 429a, 430a, 431a, and 432a which are in vertical alinement with slots 429 to 432 in member 424 which has just been described and which is disposed below member 460. To the rear surface of this member 460 is secured a plate 463 to hold the selector bars 455 to 458 inclusive in a slidable manner near the upper end thereof. The portions 434 and 435 of member 433 have sliding movement in the spaces 461 and 462.

A shaft 465 is fixedly mounted in the plates 350 and 351 and spans the distance therebetween. On this shaft in the central portion thereof are pivotally mounted side by side the latch levers 466, 467, 468 and 469, and each of these latch levers has the upper ends thereof projected far enough to normally swing clear of the rods A, B, C, D, E and F but not far enough to clear the path traveled by the trip lugs A' to F' inclusive, and the lower ends of these latch levers are adapted to normally rest in the notch 458a of each of selector bars 455, 456, 457 and 458, and are held in such position normally by each one having a tension spring 470 secured to the upper portion thereof at one end, and the other end of each of said springs is secured to a transversely disposed rod 471 which is mounted at its ends in the plates 350 and 351.

The fixed bar 410 has pivotally secured thereon bell crank lever 480 which has the portion 481 projecting upwardly and in constant engagement with pin 482 which is secured in a downwardly projecting portion of slidable bar 409, and this bell crank lever has a horizontally disposed portion 481a and at the end of this horizontally disposed portion 481a, a right angle turn projecting inwardly beneath the end of selector bar 456. The bell crank lever 480 is pivotally mounted on the fixed bar 410 on pin 483.

Slidable bar 409 is disposed immediately above fixed bar 410 and this has a pin 484 therein on which is pivoted bell crank lever 485, which is similar to the bell crank lever just described, and the upwardly projecting portion thereof engages pin 486 in slidable bar 408 and the horizontal portion of said lever which has the inwardly projecting portion similar to that just described, projects in the path of the selector bar 455. The slidable bar 408 has secured thereto a tension spring 489, the other end of this tension spring being secured to the plate 414, the purpose of this spring being normally to pull the slidable bar 408 against its associated bell crank lever. The slidable bars 411 and 412, the fixed bars 413 and the selector bars 457, 458 also have associated therewith a structure identical to that just described for the bars 408, 409 and 410 and the selector bars 455 and 456. By referring to Figure 33 it will be seen that fixed bar 413 has a pivot pin 500 therein on which is pivotally mounted bell crank lever 501 which has an upwardly projecting portion 502 which is adapted to normally press at all times against a pin 503 fixed in a downwardly projecting portion 504 of slidable bar 412. The bell crank lever 501 has an inwardly projecting portion 505 which projects toward 455 and 456 beneath the bar 457, on which projection said bar rests at all times.

The bar 412 has a pivot pin 506 therein, on which is pivotally mounted bell crank lever 507 which is identical to lever 501 except that the upwardly projecting portion 508 has a length which is twice as great as the upwardly projecting portion 502 on lever 501. This upwardly projecting portion 508 fits at all times against a pin 509 in bar 411, and the inwardly projecting portion 510 of the horizontal portion of said bell crank lever 507 projects beneath selector bar 458 and supports the same at all times.

The bar 411 has secured as at 512 a tension spring 513, the other end of this tension spring being secured to a stud in the side wall portion, the purpose of the spring being to normally pull the slidable bar 411 to the left hand in Figure 33 at all times.

The operation of slidable bars 408 and 409 and the bell crank levers thereon and the action with relation to the selector bars 455 and 456 is identical to the mechanism shown in Figure 33 and, therefore, a description of the operation in Figure 33 will apply, likewise, to the slidable bars which have already been described, except that the motion is reversed.

Pivotally mounted on shaft 465 is a shifting lever 520 which has an arm 521 integral therewith. A tension spring 522 is connected at one end of the lever 520, and the other end thereof is secured to shaft 471 for normally pressing the lever 520 inwardly to a point where it will not engage the rods A, B, C, D, E and F as it is limited in its swinging movement inwardly by the portion 521 resting against the lower surface of member 460. Pivotally secured to the free end of the portion 521 is a connecting link 523 which is pivotally connected as at 524 to a rocker lever 525. This rocker lever 525 is pivotally mounted on shaft 526, and the other end of this rocker lever 525 has pivotally secured thereto as at 527, a link 528 which projects upwardly and has a slot 529 which is vertically disposed in the upper end thereof which loosely engages a pin 530 in one end of rack operating member 531 which member is pivoted intermediate its end as at 532 to slidable bar 411, and the free end of this rack control bar 531 has upwardly projecting portion 533 and a downwardly projecting similar portion 534 (see Fig. 10). Normally, the projection 533 rests in notch 535 in sliding rack 536 which is slidably mounted in a member 537 and held in sliding position by a plate 538 which is secured thereto. A similar bottom rack 539 is slidably mounted in guide member 540, and plate 541 is secured thereon to hold the rack in sliding position, and this rack has a notch 542 in the upper side thereof which is adapted at times to be engaged by projection 534 on member 531.

Rack 536 has gear teeth 544 on the lower surface thereof, and rack 539 has gear teeth 545 on the upper surface thereof, said gear teeth being adapted to engage at all times with a pinion 546 which is fixedly secured on the individual pin shaft 600 which shaft holds the pins, to be later described, for operating the key rod lifters and similar parts which will be later described.

Another shifting lever 550 which is identical to the shifting lever 520, which has been described, is mounted on shaft 465 and is held in position by a spring identical to the spring 522 shown in Figure 35. This lever has integral therewith an arm 551 to which is pivotally connected at the outer end thereof as at 552 a link 553 which projects downwardly. This link has a slot 555 in the lower end thereof in which pin 554 in one end of rack actuating member 556 is mounted. This rack actuating member 556 is pivotally mounted as at 557 on movable transverse sliding bar 408, and the free end of this rack actuating member has an upwardly projecting portion 558 and a downwardly projecting portion 559. Bar 416 is cut in two parts to allow pivot 557 to have movement (see Fig. 30). The downwardly projecting portion 559 is adapted to normally rest in notch 560 in sliding rack 561 (see Fig. 2) which is slidably mounted in slide member 562 which has a plate 563 thereon for confining the rack in a slidable manner, and this rack has rack teeth 565 on the upper side thereof.

The upper projection 558 on the rack actuating bar 556 is adapted at times only, to rest in notch 566 in rack 567 which is slidably confined in member 568 by means of a plate 569 being secured thereto so as to confine this member in a slidable position, and this slidable member has rack teeth 570 on the lower face thereof, the rack teeth on these two slidable members being adapted at all times to engage opposite sides of pinion 571 which is fixedly mounted on the section selecting pin shaft 601, the structure of which will be presently described.

Pin shaft 600 has on the other end which is removed from the rack bars which have just been described, a toothed segment 602 which is fixedly secured on said pin shaft, and this is adapted to be engaged at all times by a roller 603 mounted in the free end of member 604 which is pivoted to the end plate 16 as at 605 and the roller is held in engagement with the toothed segment 602 by means of a tension spring 606.

Likewise, pin bar 601 has a toothed segment 607 fixedly secured thereon whose teeth are adapted to be engaged at all times by a roller 608 mounted in the free end of member 609 which is pivotally mounted as at 610 in the outer surface of end plate 16 and this has secured intermediate the ends thereof a tension spring 611 which has its other end secured to the end plate 16 for normally pressing roller 608 into engagement with segment 607, the purpose of the arrangement on both of these pin shafts being to hold the shafts in whatever position they are moved by the selector mechanism.

By referring to Figures 7, 39, 40 and 41 it is seen that pin shaft 600 is divided into sections 620 to 633 inclusive. The sections are indicated only in diagrammatic form as the pin shaft is one solid piece of material, but in Figure 39, I have shown the bar divided into sections as illustrated and the sections 621 to 628 inclusive hold the individual pins for lower case characters, punctuation, etc., which are adapted to have engagement with the key rod operating bars which will be presently described. The pins in section 629 to 632 inclusive are for operation of the capital letter section of a typesetting machine.

Section 633 has therein pin 640 for operating the space band key rod lever of the typesetting machine. Section 620 is for operating capital letter shift by pin 641, and for performing other functions. The pins in pin bar 600 are shown disposed along eight parallel lines on the pin shaft, and there I show a center line designated by "O" and the lines above the center line "O" are indicated by the reference characters 1, 2, 3 and 4, and the lines below the center line "O" are indicated by the reference characters 1a, 2a, 3a, and 4a. The pin shaft 600 normally rests with the center line so that the center line "O" is in the same parallel plane as the plurality of section bars 620b to 632b inclusive, and also pin 633b which is used to cooperate with the single pin 640 in section 633.

Pin shaft 601 is divided into section 620a to 633a to correspond to similar sections in the individual pin shaft 600, and each part of these sections has one pin therethrough, each pin being in a different line and said center line on said pin bar which is adapted to normally rest in the same parallel plane as the section bars 620b to 632b inclusive, and this center line is indicated by reference character "O'", and the lines on one side of center line are indicated by 1', 2', 3' and 4', and the lines on the other side are indicated by 1a', 2a', 3a' and 4a'.

The pin shown in section 633 of Figure 39 is indicated by reference character 640, and this is the pin that operates the mechanism for operating the key rod for depositing the space band in the assembler mechanism. Reference character 641 indicates the pin in pin shaft 600 for the shift key rod and shift mechanism, and 641a indicates the corresponding pin in pin shaft 601 which coincides with pin 641 which cooperates with pin 641b for operation of pin 641 when pin 641a moves.

All of the pins not otherwise designated are identical in structure in the pin shafts and those in pin shaft 600 are indicated by the reference character 650 and those in pin shaft 601 are indicated by reference character 651. Each of the pins has a head 650a or 651a as the case may be, to prevent the same from sliding out of position. Passing across the machine and mounted in the end plates 15 and 16 are bars 653 and 654, (see Fig. 7) which have concave arcuate surfaces next to the heads of the pins to control the pins and prevent them from coming out of the pin shafts, and these extend far enough around the pin shafts and spaced some distance therefrom to cover the arc traveled by the pin shafts in either direction.

Secured to bar 654 is an angle iron member 655 for supporting the section push bars 620b to 632b inclusive and also support pin 641b and 657b and 658b at the other end thereof. Secured in spaced relation to angle iron 655 is a bar 659 having pins 660 therein to which one end of tension spring 661 is connected, and the other end of this tension spring is connected to pin 662 in each of the section push bars 620b to 632b inclusive; also pins 633b and 641b and 657b and 658b have a similar arrangement for returning the pins and push bars to normal position. The push bars 620b to 632b are broad enough at one end to cover their respective sections 620 to 632 respectively and are thick enough to engage one pin in each section at a time without engaging the other pins in one of said sections. Associated with pin shaft 600 is a member 665 which has a concave arcuate surface next to the pin shaft to prevent the head of said pins from coming out of the pin shaft and on top of this member is secured a plate member 667 which has a plurality of notches 668 therein, there being one notch for each of the oscillating members 669 (see Figs. 5 and 7).

Also associated with pin shaft 600 is a member 670 which has an arcuate surface next to the pin bar for confining the pins in position, and this is spaced downwardly from member 665 to provide a space therebetween through which the pins may pass and into which projections 671 on members 669 pass, and the shoulder 672 on member 669 rests against bar 665 to limit the inward movement so that projections 671 will not pass into the path of the pins as the pin shafts are moved.

Secured to the lower surface of member 670 is a plurality of pins 673, there being one for each of the members 669, and a tension spring 674 is secured at one end to a pin 673 and the other end of each tension spring is secured in hole 675 in member 669, the purpose of this being to normally pull members 669 against the bar 665 to allow the key rod operating means to return to normal position.

The members 669 are mounted in spaced relation on a shaft 676 which members 669 are spaced apart from each other by means of spacers 677 to aline them with the plate member 667. These members 669 operate to push the key rod lifters, all of which are indicated by reference character 678 except a few special ones which will bear a separate reference character because they are for a special purpose, but each of the key rod lifters which serves to operate a particular common key in the typesetting machine bears the same reference character. All of these key rod lifters including the ones indicated by special reference characters, fit in a comb member 680 which is mounted between the end plates on a bar 681. Each of these key rod lifters has a slot 682 therein through which a rod 683 passes, said rod being secured to the end plates 15 and 16 of the machine.

The key rod lifters 678 are also secured in a comb member 684 which has a plurality of notches in the side thereof, there being one notch for each key rod lifter, and this comb rests on bar 685.

The key rod lifters are pulled back to normal position by means of a tension spring 686 secured to each of the key rod lifters at one end, and the other end of each of said springs being connected to a bar 687 passing across between the end plates of the machine.

Key rod lifters 678 and similar members are lifted upwardly by means of an oscillating bar 700 which is mounted on the free ends of arms 701, 702, 703 and 704 (see Fig. 13) which are fixedly secured on an oscillating shaft 705 mounted between the end plates 15 and 16, and this shaft projects through a sidewall portion, (see Fig. 4) and on the end thereof has secured an arm 706 to the free end of which, as at 707, is pivotally secured a link 708, the other end of said link being secured intermediate the end of lever 709 as at 710, and this lever is pivotally mounted on shaft 206, and the free end of this lever 709 has a roller 711 therein which is adapted to follow a cam 45 which is fixedly secured on shaft 27 which projects through sidewall 16 and has this cam mounted on the end thereof.

Each of the key rod lifters 678 coincide with the key rods 30 of the typesetting machine so that when any one of these key rod lifters 678 is pushed in the path of oscillating bar 700 by a combination of pins in the two pin shafts, it will cause the oscillating bar 700 to raise this particular key rod lifter and raise the key rod which formerly was raised by the manually operated key board.

When a capital letter code character is scanned on the control sheet it causes a set-up in the selector mechanism to cause the pin shafts 600 and 601 to be shifted to a position where pin 641 (see Figs. 7, 39, 40 and 41) and the intermediate push pin 641b will coincide with pin 641a in individual pin shaft, to push member 715 in the path of bar 700. This member 715 is mounted in the same manner as the key rod lifters by having a slot 716 therein which is pierced by shaft 683. This member 715 does not coincide with any key rod in the typesetting machine, but the work which it performs is clearly visible in Figure 15. This member 715 has a hole 717 therein in which a tension spring is similarly mounted as the tension spring 686 for the key rod lifters, and below this hole and opposite the slot 716 an inwardly sloping surface 718 is cut which has a shoulder at the bottom end thereof on which lever 719 is adapted to rest normally, said lever being pivoted on stud bolt 720 mounted on the inner sidewall portion of the block 721 which is secured to end plate 16.

The lever 719 has an upwardly projecting portion 722 intermediate the ends thereof and a slot 723 is cut in the lower surface of member 719 and extends upwardly into the projection 722. A bell crank lever 724 is pivotally mounted on stud bolt 725 secured in block member 721, and this bell crank lever has a shoulder 726 near the upper end thereof, which is adapted to engage the lower surface of lever 719 when this lever is in raised position.

Bell crank lever 724, at the other end thereof, has secured a leaf spring 728 which is fixedly secured on a screw 729 which is fixed in block 721, the purpose of this leaf spring being normally to press downwardly on portion 724 to cause shoulder 726 to engage the bottom of lever 719 when it is raised upwardly by the moving upward of member 715. Also secured to screw 729 is a tension spring 730 which has its other end secured to an upwardly projecting portion 731 of swinging and sliding member 732, which is slidably mounted on stud bolt 733 by having a slot 734 therein which is penetrated by this stud bolt. Pivotally connected to member 732 is a link 735 which has its lower end pivotally connected to bar 704 as at 736 (see Figs. 13 and 15) and also mounted on pin 736 is a tension spring 737 which has its upper end connected on a pin 738 secured to the end plate 16, the purpose of this being to cause roller 711 in Figure 4 to follow cam 45 on shaft 27.

Pivotally secured on pin 740 in member 719 is a connecting link 741 which has a slot 742 in the lower end thereof in which pin 743 which is fixed in the end of lever 744, has sliding movement. This member 741 has laterally projecting portions 745 and 746 thereon there being a tension spring 747 connected to portion 745 which is connected to the end plate 16, and the portion 746 has a tension spring 748 secured thereto, the other end of said tension spring being secured to member 744 in the lower end thereof.

Lever 744 is pivoted intermediate its ends on stud bolt 750 which is secured in the end plate 16, and the other end of this lever 744 has a pin 751 therein to which is pivotally secured a link 752 which has a pin 753 in the other end thereof which pivotally connects the link 752 to lever 754 which is fixedly secured on shaft 755.

Shaft 755 has secured thereon a hook 757 (see Figs. 37 and 38) which is in close proximity to lever 766 which is fixedly secured on shaft 206 and this lever has a pin 761 therein which is adapted to be engaged by the hook 757 to prevent the roller 767 in the free end of said lever 766 from following the cam 44 on the main drive shaft 27, and therefore, prevents reciprocation of bar 764 which is secured on arms 765 and 766.

Bar 764 which is secured to the arms 765 and 766 which are fixedly secured on shaft 206 and are oscillated when allowed to do so by cam 44 engaging roller 767 to press toward the pin in pin shaft 601 to push whatever pins which are in alinement with it against the intermediate push bars 620b to 628b respectively, and also the special pins which are provided for the operation of special keys for a special means, but when the hook engages the pin on the lever, it prevents the oscillation of the bar and, therefore, prevents the lower case oscillating means from engaging any of the pins, but the capital letter portion of the proposition works during this time.

With the parts in the position shown in Figure 15 the hook 770 also fixedly mounted on shaft 755 is in engagement with pin 771 in lever 775 to hold this lever in such a position as to prevent the roller on the end thereof from following its respective cam, and this holds the capital letter operating bar 772 in an inoperative position until a high case code character has operated the means for producing a capital letter. This bar 772 is mounted on an arm 774 at one end thereof which is loose on shaft 206 and the other end thereof is secured to lever 775 which has a roller 776 in the free end thereof adapted to follow cam 42 on drive shaft 27. Parts 775 and 774 are loosely mounted on shaft 206.

Fixedly secured on shaft 206 is an arm 777 which moves with arm 765 and bar 764 and this is provided for operating the pin 640 for the space band key rod lifter. By observing Figures 7 and 37 it will be seen that the arm 235 is fixedly secured thereon, and this is connected to link 234 which serves to prevent the lower case oscillating means from moving the pins while the intermittent shaft 53 is moving.

On the control sheet it will be seen that there are certain cell controls for imparting a space band between each word in the line of type and it is also to be observed that when a line is finished that should extra space be desired between the words that a cell control character can be put at the beginning of the line to impart extra space between the words. Between each word, a space band code characteristic will be placed which will operate the selector mechanism to cause pin 640 in pin shaft 600 to coincide with the pin in section 633a of pin shaft 601 and this pin in shaft 601 will push against space band key rod lifter 780 (see Fig. 8) which has a slot 781 therein which is penetrated by shaft 683 for mounting the same in a manner similar to the other key rod lifters.

The pushing of pin 640 and the pin in section 633a of pin shaft 601 will push member 780 in the path of the oscillating bar 700 which will raise 780 and cause the typesetting machine to place a space band in line. When it is desired to impart an extra space to the line between the words, then a special code will be placed at the beginning of the line on the control sheet which will cause pin at the intersection of line 2 in section 626 in pin shaft 600 to coincide with the pin in section 626a in pin shaft 601 and this will push a vertically slidable member 782 backward. This member 782 has a slot 784 therein which is penetrated by shaft 683 for mounting the same, and if desired, this bar 782 is cut off at the lower end to prevent it from being engaged by the bar 700. Pivotally connected to bar 782 as at 785 is a link 786 which has a slot 787 in the other end thereof which is penetrated by a pin 788 in arm 789 which is fixedly secured on shaft 790 which is mounted in the end plates 15 and 16.

Also fixedly secured on shaft 790 is an arm 791 which has loosely mounted therein a connecting rod 792 which has adjustable lock nuts 793 on the end thereof and the other end of this link is secured in a loose manner to the top of pin 794 which is fixed in a projection 795 in a U-shaped member 796 which is pivotally mounted as at 797 on a block 798, and a spring 799 is adapted to hold the U-shaped member 796 in the position shown in Figure 8. This U-shaped member in the two upwardly projecting portions thereof has slidably mounted a headed pin 800 which has a cross pin 801 therein and a compression spring 802 is mounted between said cross pin and the other upwardly projecting portion of said U-shaped member, the purpose of this being to force the pin 800 to assume the position shown in Figure 8 to cause its head member to press against the outer surface of one of the prongs of the U-shaped member 796.

Fixedly secured on shaft 790 is a dog 803 which normally rests against a pin 804 in end plate 15, and pivotally secured in end plate 15 on stud bolt 805 is a bell crank lever 806 which has a notch 807 in the lower horizontal portion thereof which is adapted at times to engage the upper end of dog 803. A compression spring 808 is secured to the horizontal portion of lever 806 to normally press the same downward. The upwardly projecting portion of lever 806 has a pin 809 therein which penetrates a slot 810 in link 811 which extends across and is connected as at 812 (see Fig. 14) to lever 285.

Rotatably secured in end plates 15 and 16 is a shaft 813 which has fixedly mounted thereon a downwardly projecting arm 814 which has pivotally secured as at 815 in the lower end thereof a link 816 which is pivotally connected as at 817 to extra space key rod lifter 818 which has a slot 819 therein which is penetrated by shaft 683 for supporting the same. The shaft 813 also has fixedly secured thereon close to end plate 15 a downwardly projecting dog 825 and a torsion spring 826 is loosely mounted on said shaft, and one end thereof presses against the back side of dog 825, and the other end thereof is secured to a screw 827 in end plate 15. The purpose of this spring is to normally hold extra space key rod lifter 818 out of path of oscillating bar 700.

From the description in Figure 8, it is seen that when pins operate bar 782 that it pushes dog 803 back to cause it to be engaged with notch 807 and this pulls pin 800 to the dotted line position shown in Figure 8 to cause it to assume a position in the path of travel of space key rod lifter 780; also it is in alinement with dog 825, and by this arrangement, it is seen that every time a regular space band is placed in the line by the operation of member 780 that this moves pin 800 and pushes dog 825 backward and pulls bar 818 into the path of reciprocating bar 700 and this causes an extra space to be thrown into the line simultaneously with the regular space band. This operation takes place during the setting of the entire line, and when the line is finished and the carriage returns to a position to start a new line the paper shifting mechanism shown in Figure 14 operates, and this causes link 811 which is connected to lever 285 in the paper pulling mechanism to be moved to cause pin 809 to engage the right hand portion of slot 810 as shown in Figure 8 and raises the horizontal portion of lever 806 to cause the dog 803 to be released from notch 807 and rest on pin 804 and causes the parts to return to normal position as shown in Figure 8 which disconnects the extra space mechanism from operation.

Pivotally mounted as at 835 on end plate 15 is a member 836 which has an outwardly projecting lug 837 on the lower end thereof which normally occupies a position in the path of inwardly swinging lever 68 as will appear in Figure 2. Intermediate the ends of member 836, the same is pivoted on pin 838 to a link 839, the other end of said link being connected as at 840 to a lever 841 pivoted in its center at 842, and the upper end of this lever has pivoted thereto as at 843 a link 844, the other end of this link being pivotally connected as at 845 to lever 846 which is secured to a shaft 847 which pierces both end plates 15 and 16. Fixedly secured on shaft 847 is an irregularly shaped lever 848 which projects above and into the path of an especially provided member 878 identical to key rod lifters 678, which member is adapted to be swung into the path of reciprocating bar 700 when the scanning mechanism scans six successive spaces which are blank and which allows light to go through all cell controls in a code and, therefore, does not set up a special combination in the selector mechanism, and when this happens, then this vertically movable member 878 which is associated with lever 848 is raised on account of pins in bars 600 and 601 coinciding to operate this particular member only to swing it in the path of bar 700.

Loosely secured on shaft 847 is a compression spring 849 which normally holds lever 848 in the path of its associated vertical reciprocating bar 878, and this shaft extends some distance beyond the outer sidewall surface of member 16 and a flanged screw 850 thereon which is engaged by a fork 851 on lever 852. Lever 852 is integral with hub portion 853 which hub portion is mounted on pin 854, which pin is mounted in projections 855 and 856 in the outer surface of end plate 16, and this hub portion has a downwardly projecting portion 857 in which a set screw 858 is adjustably mounted for limiting the outward swing of the upwardly projecting portion 860 which portion 860 has a spring 861 mounted between the same and end plate 16 to normally press set screw 858 against end plate 16, which spring is stronger than spring 849.

Secured in the upper end of portion 860 is a set screw 862, the end of which, on which no head appears, being adapted to engage line delivery carriage return lever 35 which indicates that the typesetting machine is ready for the receiving of another line of type set by my machine and when lever 35 engages screw 862, it releases shaft 847 by causing fork 851 to move away from collar 75

650, and this allows spring 849 to shift shaft 847 to cause lever 848 to remain in normal position and to be in the path of its associated lifting bar 878 which is mounted on rod 683 and an upward movement of bar 878 moves lever 848 upwardly and gives a slight turn to shaft 847 which moves link 844 which moves lever 841 and also link 839 to pull projection 837 from beneath lever 64 and allows pin 55 to engage one of the holes 54 in spur gear 52 to start the intermittent shaft 53 which revolves one complete revolution at a time. In link 839 is a pin 839a which has a spring 839b secured thereto, and the other end of it is secured to the end plate 15 of the machine for normally exerting a tension to cause projection 837 to swing in the path of lever 64.

Secured in the end of lever 870 is a set screw 871 which lever is pivotally mounted as at 872 and this lever projects inwardly and has an upwardly portion 873, and pivotally mounted on screw 872 is another lever 874 which has one side thereof resting against the upwardly projecting portion 873. The other end of this lever has connected thereto a spring 875 which is also connected to a portion of lever 870 which normally forces the top lever 874 against projection 873 and top of lever 874 projects outwardly in approximate alinement with the end plate 15. The free end of lever 874 is adapted to be pressed against a pin 876 by spring 875 when the carriage engages pin 871 in a position for the starting of the scanning of a new line, and in this position lever 874 presses against arm 846 on shaft 847 and pushes the same to cause lever 848 to coincide with member 877 and, therefore, removes it out of the path of its normal associated rising bar 878 and prevents bar 878 from pressing against lever 848 and prevents the clutch from being tripped while the scanning mechanism is scanning a predetermined number of spaces where cell controls might be, at the beginning of a line of code matter.

When the carriage moves out of engagement with set screw 871 it allows shaft 847 under pressure of spring 849 to move back to normal position in the path of its associated rising bar 878 then on the next operation rising bar 878 will press lever 848 upwardly and partially rotate shaft 847, and this will move link 844 and associated parts, and will pull projection 837 from beneath lever 64 and allow pin 55 to engage one of the holes 54 in gear 52 which is fixed on intermittent shaft 53. Were it not for this arrangement the carriage would be continuously returned to initial position when an entirely blank space was scanned by the scanning means at the beginning of a line but by holding clutch out of operation with shaft 53 it prevents the movement of shaft 53 when the scanning mechanism is scanning blank spaces where no dark cell controls appear at all in a code; whereas, at the end of a line when the scanning mechanism moves successively over six successive transparent cell controls it fails to set up a combination and causes the intermittent shaft 53 to be driven and return the carriage to initial position.

By referring to Figures 65 and 66 it is seen that each code comprises a plurality of cell controls which in the present embodiment of the invention comprises cell controls 901, 902, 903, 904, 905 and 906. The arrows in Figure 66 indicate the direction of scanning, and there it is seen that the scanning operation on account of the rocking of the carriage mechanism and the escapement mechanism begins the scanning of cell control 901 and then moves over 902 and 903 and at this point the escapement mechanism allows a half letter space movement in the carriage and control sheet and then while it is in this position cell controls 904, 905 and 906 are scanned, and then the escapement mechanism allows the carriage to move to another half space and the next code is scanned in exactly the same manner as that described for Figure 66.

Let us suppose that the mechanism is in position to scan the letter "T" or "t" shown in Figure 66 which may be of high or low case. It will be observed that light will pass through cell control 901 and actuate light actuated cell 333 which will allow current to pass therethrough and through an amplifier and to relay 384 which energizes magnet 374 and pulls armature 372 against the same, allowing cam lever 363 to be free and, therefore, its portion 364 will not move rod A as is apparent in Figure 18, and therefore, trip lug A' will not engage dog 520 and portion 534 of rack 531 will stay in its normal raised portion (see Figs. 10 and 33). Then the rocking carriage will cause the beam of light to focus on cell control 902, and this being dark will fail to energize magnet 374 and cam lever 363 will not be released and the cam member 364 will engage rod B and will move it to the left in Figure 18, and will cause trip lug B' to engage latch lever 469 and will allow its associated selector bar to move upwardly, and this will allow selector bar 458 to raise upwardly and bell crank lever 508 will move outwardly under tension of spring 513 in Figure 33 and will cause projection 533 to move sliding rack bar 536 which revolves spur gear 545 in a counter-clockwise direction to move pin shaft 600. The above described operation will not take place until the entire combination is set up.

After the operation of rod B by cell control 902 then the beam of light will be focused on the cell control 903 which likewise is dark, and this will cause the rod C to be moved to left in Figure 18 by cam 364 as already described and will aline trip lug C' with latch lever 468.

The scanning mechanism and the beam of light associated therewith will pass successively over cell controls 904, 905, and 906 which are not darkened and this will cause magnet 374 to be energized to release cam lever 363 and, therefore, rods D, E, and F will not be moved. During the above described operation, the selector cylinder will not be moved quite a complete revolution, and the setting up operation having been completed, then the trip lug B' having operated its associated selector bar and the bell crank lever and the rack as above described, this operation will take place simultaneously with the raising of selector bars 457 and 458, selector bars 457 and 458 being both allowed to move upwardly and this allows a multiplying of the movement of sliding member 411 by allowing both sliding members 411 and 412 to move on account of bell crank levers 501 and 507 both being allowed to move upwardly as to their horizontal portion and thus the pins 503 and 509 being allowed to move with the sliding bars on account of the selector bars 457 and 458 moving upwardly will, by their combined movement, allow member 531 to cause projection 533 to move sliding rack bar 536 far enough to rotate pin shaft 600 in a counter-clockwise direction, far enough to reach the proper pins and to operate the proper pin in pin shaft 600 which is in section 621, line 4, push the key rod lifter associated therewith in line with the oscillating bar

700 to allow the letter "T" to be set by the typesetting machine.

The right hand portion of code shown in Figure 66 and comprising cell controls 904, 905 and 906 control two of the selector bars in the selector mechanism which are indicated by reference characters 455 and 456, and also dog 550, and by these cell controls and the letter "T" being set, therefore, sectional pin shaft 601 is not moved at all, and it is dwelling in normal position and, therefore, the single pin in section 621a will coincide with the pin on line 4 of section 621 and through the intermediate pusher member 621b will cause the operation of the key bar controlling the letter "T". The moving of the pins as just described in the pin bars is accomplished, of course, by oscillating bar 764 striking the pins in the sectional pin bar in section 621a.

Figure 27:
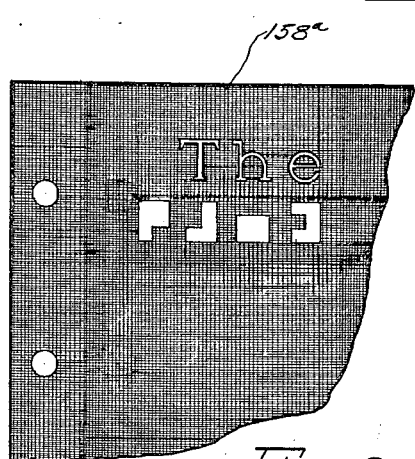
Figure 27 is a view of a portion of a control sheet of opaque character having some of the cell controls left in a translucent state.
Figure 28:
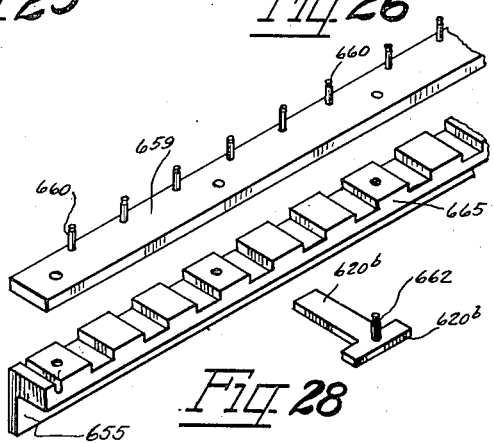
Figure 28 is an isometric view of a portion of the section bars of the section-selector means and showing the parts in exploded position.

Throughout the description I have used a dark spot as the cell control for preventing magnet 374 from being energized. It is evident that by reversing relay 384 and causing it to be normally closed that the cell controls would be reversed and an unshaded cell control would cause moving of the rods A, B, C, D, E and F in the selector mechanism in the same manner as a shaded portion causes such movement under the present arrangement. Therefore, it is evident that the control sheet can be made by having the cell controls of unshaded material and the rest of the sheet of opaque material if desired, and accomplish the same result without any change whatever in the mechanism. In Figure 27 I show a control sheet 158a which may be of opaque material if desired with the cell controls translucent, this being shown to indicate that the portion of the paper which does not come under the beam of light can be of any desired color or texture as it has no effect on the scanning mechanism. Figure 27 may also represent a stencil sheet for making control sheets such as shown in Figure 67.

In Figure 65 the code characters are shown spaced apart from each other for clearness, but in actual practice there would be no space between them as both columns of the code are scanned on one complete rocking of the carriage and on the next complete rock of carriage the next code is scanned. In Figure 69 I show the letters "L", "M", "N" and "T" in succession as they would appear on a control sheet and the arrows show the movement of the scanning, and some of the cell controls have reference characters similar to Figure 66.

The control sheet can be prepared in any desired manner, and one form of preparation of this control sheet is by using a typewriter having the code matter on the type bars and the letter itself can be associated with said code matter if desired, and in my copending patent application Serial Number 426,854, I have shown a machine for preparing the control sheet, although I am not limited to this method of preparation of the control sheet as it can be prepared from plates, such as printing, electric typewriter, mimeograph, multigraph, telephotography, or otherwise.

In the drawings and specification there has been set forth a preferred embodiment of the invention, and although specific terms are employed, they are used in a generic and descriptive sense only, and not for purposes of limitation, the scope of the invention being set forth in the appended claims.

I claim:

1. Means for reproducing printed characters comprising a mechanism adapted to receive a control sheet, a plurality of imperforate code characters on said sheet, there being one code for each character to be reproduced, some of said code characters comprising a plurality of cell controls, a machine for reproducing printed characters, means in said mechanism for receiving said control sheet, a light sensitive cell, means for moving said control sheet with relation to said light sensitive cell to cause the cell controls in each code character to be successively scanned by said light sensitive cell, and means operable by the scanning operation for automatically reproducing the character represented by the code character scanned by said scanning mechanism.

2. Means for automatically setting type in a typesetting machine comprising a control sheet of imperforate material and having thereon code matter, said code matter comprising a plurality of code characters, and each character comprising a plurality of cell controls, means associated with the typesetting machine for receiving said control sheet, a light sensitive cell associated with said means, means for moving said control sheet with relation to said light sensitive cell, a source of light and means for focusing the same on the light sensitive cell, means for supporting the control sheet between the source of light and the light sensitive cell and means for moving the control sheet to cause the light to successively pass over the cell controls on said control sheet.

3. A control sheet adapted to be placed in a mechanism associated with a typesetting machine, said control sheet having thereon legible characters and code characters associated with each legible character, a light sensitive cell, a source of light, means for focusing said source of light on said light sensitive cell, means for supporting said control sheet, and moving the same with respect to said light sensitive cell to cause the ray of light to pass successively over the cell controls of each code character and means operable by said light sensitive cell for selectively operating the key bars in the typesetting machine, said control sheet having a code character to determine the case of the character to be set by the typesetting machine.

4. Means adapted to be associated with a typesetting machine for automatically setting type therein comprising a light sensitive cell, a relay adapted to be closed by said cell, a rotary selector mechanism, a magnet connected to said relay and having operable engagement with said rotary selector mechanism, means controlled by said magnet for controlling the position to be assumed by the elements of said rotary selector mechanism, a control sheet, a source of light, means for focusing said source of light on said cell, means for moving said control sheet with relation to said source of light and said cell to cause the ray of light and said cell to successively scan the code characters thereon to control the magnet of the selector mechanism to automatically and selectively set the type in the typesetting machine.

5. Means for automatically setting type in a typesetting machine comprising a carriage mechanism, a source of light, a control sheet, means for focusing said source of light, means for oscillating said carriage mechanism, a light sensitive cell located beneath said carriage mechanism, means in said carriage mechanism for receiving and holding the control sheet, said control sheet having thereon a plurality of code characters, each code character comprising a plurality of cell controls and means operable by said cell after successively scanning the cell controls of each of said code characters for actuating selectively the key bars of the typesetting machine to automatically set the type therein.

6. In an automatic typesetter adapted to be associated with a typesetting machine, comprising in combination of typesetting mechanism, a prepared control sheet on which code characters appear in imperforate form in vertical and transverse positions, a light sensitive cell mechanism arranged to effect relative movement between said control sheet and said light sensitive cell, a selector mechanism, adapted to be controlled by said code characters and the cell to position a plurality of elements leading to a selected key bar, means associated with each key bar for operating the same, means for operating separately the high case and lower case key rods of the typesetting machine, said control sheet having thereon code matter to determine the case of the character next released by the typesetting machine.

7. In an automatic typesetting mechanism for typesetting machines having an assembly mechanism, comprising in combination a typesetting device, a prepared control sheet on which code characters appear in an imperforate manner, a light actuated cell, means for causing said light actuated cell to successively scan one at a time, the imperforate code characters on the control sheet, means operable by said control sheet for placing space bands and other necessary characters in the assembly mechanism, means for automatically raising the assembly mechanism when a line is completed and causing the light actuated cell to begin the scanning of another line of the control sheet, means for determining the case of the characters set by the typesetting mechanism and means for causing said scanning to begin at a predetermined point on each code character.

8. Means adapted to be associated with a typesetting machine comprising in combination a typesetting machine, a transmitting mechanism, a prepared control sheet on which code indications appear in the form of imperforate cell controls, means for effecting relative movement between said control sheet and the transmitting mechanism, both transversely and longitudinally thereof, means for returning said parts to the commencement of a new line on said control sheet, the said return mechanism being controlled by the cell controls in the code character being of similar nature throughout the code character, the typesetting means comprising means for operating the key bars of the typesetting machine, said transmitting mechanism comprising a light sensitive cell adapted to be influenced by the code matter appearing on said sheet of material to set up a combination of elements to automatically operate a selected key bar for each combination of cell controls associated with each code character on the control sheet.

9. Means for automatically setting type in the typesetting machine comprising in combination a control sheet having code thereon for each character to be set, light sensitive means for successively scanning each portion of the code for each character, a rotary selector mechanism having a plurality of individually movable members, means operable by said movable members for operating a selected key bar in the typesetting machine, a source of light, means for focusing said source of light on said control sheet and causing the same to successively pass over the various portions of a code character, means operable by said cell for controlling said selector mechanism to automatically set the type in the typesetting machine, said control sheet having code characters thereon for determining the case of the character to be set and also having code characters for causing further expanding of the line of type after the same is set, if desired.

10. In a typesetting machine, means for automatically setting type therein comprising lifting members for each of the key rods in the typesetting machine, means for moving said lifting means, a plurality of members adapted to be moved to a selected position to selectively move one of said lifting means, a plurality of members adapted to be moved to a selected position to selectively move one of said lifting members in the path of said lifting means, a selector mechanism for operating said means to select a certain lifting means to be moved into the path of the lifter and means for operating said selector mechanism for selective operation of the above mentioned parts.

11. In a typesetting machine, means for automatically setting the type therein comprising a mechanism having a light sensitive cell, a control sheet having code characters thereon for controlling said light sensitive cell, a carriage mechanism for said control sheet, a selector mechanism, a plurality of members adapted to be selectively operated to operate a selected key rod in the typesetting machine, a constantly driven shaft and an intermittently driven shaft, means operable by said constantly driven shaft for driving said selector mechanism and the means for operating the key rods and means operable by said intermittently driven shaft for operating said carriage mechanism.

12. In a typesetting machine, means for automatically setting type therein, comprising a carriage mechanism, a control sheet adapted to be held by said carriage mechanism, means for moving said control sheet in said carriage mechanism, a light sensitive cell operable to successively scan the code characters on said control sheet, an intermittently driven shaft for driving said carriage mechanism and moving said carriage mechanism transversely with relation to said light sensitive cell, means for causing said carriage mechanism to return to a new line position when the scanning of a line has been completed, and means for causing said scanning operation to begin at a predetermined point on each of said code characters.

13. In a machine for automatically setting type and adapted to be associated with a typesetting machine having key rods, means for driving said typesetting machine, a light sensitive cell, a control sheet, a carriage mechanism for holding said control sheet in position, means for moving said carriage mechanism with relation to said light sensitive cell to cause a successive scanning of the controls in the control sheet by said light sensitive cell, means for moving said control sheet with relation to said carriage mechanism, means for moving said carriage mechanism with relation to said light sensitive cell, means for operating the key rods of the typesetting machine, movable means for selectively operating said operating means, movable means, a selector mechanism for selecting a plurality of movable means for selectively operating a key bar, all of said means being controlled by said light sensitive cell.

14. In a mechanism for automatically setting type in a typesetting machine, a control sheet, a carriage mechanism, a light sensitive cell, means for causing relative movement between the control sheet and said cell, said control sheet having thereon a plurality of code characters for controlling the type to be set, each code comprising a plurality of cell controls, means for returning the carriage to a new line position when a line of code characters has been scanned by said cell, and means for rendering said returning means inoperative while the carriage mechanism is at the beginning of a new line.

15. In a machine for automatically setting type in a typesetting machine, a carriage mechanism, means for holding a control sheet in said mechanism, a source of light, means for oscillating said carriage mechanism, a light sensitive cell disposed on the other side of said control sheet from said source of light, means for directing rays of light from said source onto said control sheet, means for shifting said control sheet in said carriage mechanism to a new line position when a line has been scanned by said cell, and means controlled by said cell and said control sheet for selectively operating the key rods of the typesetting machine.

16. In a machine for automatically setting type in a typesetting machine, a plurality of key rods in said typesetting machine and lifting means therefor, a selector mechanism for selecting a particular key rod to be operated, said selector mechanism comprising a plurality of slidable rods, means controlled by said slidable rods for operating the key rods, and means for selectively determining which of the rods in said selector mechanism shall move.

17. Means for automatically setting type in a typesetting machine, comprising a mechanism adapted to be attached to the typesetting machine and having means therein for independently and selectively lifting the key rods of the typesetting machine, elevating means for the lifters, a plurality of oscillatable shafts in said mechanism, each shaft having a plurality of slidable pins therein, slidable means disposed between the two shafts, means for moving a selected pin in one shaft to move the slidable means to cause it to engage a selected pin in the other shaft, said second pin being adapted to push the key rod lifter into the path of the elevating means, and a selector mechanism for imparting movement to said shafts, and a light sensitive cell for selectively operating said selector mechanism to selectively position said pins.

18. In a mechanism for automatically setting type in a typesetting machine, a control sheet, means for holding the control sheet, the sheet having code characters thereon, a light sensitive cell, means for causing relative movement between the cell and the control sheet, means for causing movement between the holding means and the control sheet to shift the control sheet to a new line position for causing said cell to successively scan the code characters on the control sheet, each code character comprising a plurality of cell controls, means operable by said cell when it scans a portion of the control sheet not occupied by a code for returning the holding means to a new line position, and means for rendering inoperative the returning means when an absence of codes exists in the beginning of a new line.

19. In a mechanism for automatically setting type in a typesetting machine, a carriage mechanism, a light sensitive cell, a control sheet, means for holding said control sheet in said carriage mechanism, means for moving said carriage mechanism in two directions with relation to the light sensitive cell to cause said light sensitive cell to successively scan said code characters, each code character comprising a plurality of cell controls, means operable by said cell when all of the cell controls in a code character are alike to return the carriage mechanism to the beginning of a new line, and means operable by said carriage mechanism for rendering the carriage return means inoperable if a code character having similar cell controls throughout is scanned at the beginning of a line.

20. In a mechanism for automatically setting type in a typesetting machine, a carriage mechanism for holding a control sheet therein, said control sheet having a code character for each type to be set, means in said mechanism for placing a code character on the control sheet for operating the space band key rods, said control sheet also having thereon a code character for operation of a vertically slidable member, an extra space key rod lifter in said mechanism, connections between the code operating key rod lifter and the extra space key rod lifter and the regular space band key rod lifter whereby a code character at the beginning of a line of code matter will set up a combination to cause operation of the extra space key rod lifter at each time the regular space band key rod lifter is operated.

21. In a mechanism for automatically setting type in a typesetting machine comprising a control sheet, a light sensitive cell, said control sheet having control characters thereon for the type to be set, means for causing said cell to successively scan the code characters on said control sheet, a key rod lifter for the space band key rod, a second key rod lifter, an extra space key rod lifter, code matter for operating the extra space key rod lifter, connections between the space bar key rod lifter, the extra space key rod lifter and the code operating bar whereby operation of the regular space band key rod lifter will also operate the extra space key rod lifter.

22. In a mechanism for automatically setting type in a typesetting machine, a selector mechanism having a plurality of relatively movable means therein, a plurality of selector bars, a plurality of trip dogs mounted on said means, a trip latch having operable engagement with said dogs and with said selector bars, a plurality of transversely slidable bars, a plurality of pin shafts, connections between said transversely slidable bars and said pin shaft for selectively positioning all of said pin shafts, a plurality of pins in each of said pin shafts, slidable members between said pin shafts, key rod elevating means associated with one of said pin shafts, means for controlling said selector bars to selectively position all of the above mentioned parts to selectively place a key rod lifter in line with the lifting means to selectively operate a selected key rod.

23. In a mechanism for automatically and selectively operating the key rods of a typesetting machine, means for lifting the key rods, selectively operative means for individual operation of the lifting means, a selector mechanism for controlling said selectively operated means, said selector mechanism comprising a plurality of transversely movable members, a plurality of vertically movable members, connections between said second set of transversely movable members and the selective operating means for moving the same a predetermined distance and means for controlling all of said means for selective operation of the key rod lifting means.

24. In a machine for automatically setting type in a typesetting machine, a carriage mechanism, means in said carriage mechanism for receiving a control sheet, said control sheet comprising a sheet of translucent material having thereon code characters, each of said code characters comprising a plurality of cell controls, means for moving said carriage mechanism longitudinally of the machine, means for moving said carriage mechanism transversely with relation to said light sensitive cell, means for returning said carriage mechanism to the starting of a new line position, means for causing said light sensitive cell to begin its scanning operation by said light sensitive cell for selectively operating the key bars in the typesetting machine.

25. In a machine of the kind described, a source of light, a carriage mechanism adapted to hold a sheet of material, a light-sensitive cell in operative relation with said carriage, a window mechanism movable with the carriage and means for causing relative movement of the carriage mechanism with relation to said cell to expose different portions of the sheet of material.

26. In a machine for automatically operating the key releasing bars in a typesetting machine, a pair of rotatable shafts, a plurality of transversely slidable pins in said shafts, a selector mechanism, control means for operating said selector mechanism for operating said shafts and means for moving a pair of said transversely slidable pins for actuating a selected key releasing bar.

27. Means for automatically selecting characters in typesetting, typeforming, matrix-setting machines and the like, comprising a control sheet, a pair of rotatable shafts, a plurality of pins slidably mounted transversely of said shafts, means operable by the control sheet for independently rotating said shafts, means for moving a pair of coinciding pins in said shafts, and means operable by said pins for actuating a character in said machine.

28. Means for automatically selecting character bearing members in typesetting machines and the like comprising a control sheet, a rotatable member, a plurality of movable members in said rotatable member, means operable by said control sheet for selectively operating some of said movable members for causing a selected character to be moved to reproducing position.

29. Means for automatically selecting character bearing members in typesetting machines, matrix-setting machines, typeforming machines and the like, comprising a control sheet having a plurality of controls for each character bearing member, a selector member having a movable member therein for each control, means for reading the controls and moving said selector member in timed relation to each other, and means operable by said movable members for selecting the character represented by said controls.

30. Means for automatically selecting character bearing members in typesetting machines and the like, comprising a control sheet having thereon a plurality of controls for some of the character bearing members, a selector mechanism operable by said controls for setting up a combination in said selector, a pair of rotatable shafts, each of said shafts having pins slidably mounted therein in staggered relation, means operable by said selector mechanism for rotating said shafts, means for moving said pins after the selector mechanism has positioned said shafts, and means operable by said pins for releasing a character bearing member from said machine.

31. In a typesetting machine having matrices, control mechanism, a selector, a single magnet operated by said control mechanism for operating the selector for selecting said matrices for assembly, said control device, in advance of a complete assembly of a line, operating said selector to select all the necessary extra spaces in that line and an overlap means whereby said selector is selecting a matrix while the previously selected matrix is being assembled.

32. In combination, a linecasting machine and a selector solely mechanically operated for selectively controlling the matrices of said linecasting machine, and a single magnet for controlling the mechanical operation of the selector.

33. In combination, a typesetting machine, a selector comprising a single magnet and mechanical members controlled thereby for selectively operating the matrices of said typesetting machine.

34. In a typesetting machine having a plurality of matrices and a selector comprising a single magnet and solely mechanical members controlled by the magnet for selectively releasing said matrices.

35. In a typesetting machine having a plurality of matrices and means for assembling the matrices, selector mechanism for selectively releasing said matrices, a control sheet for controlling the selector mechanism, and an overlap device whereby said selector mechanism is operated in accordance with a new matrix selection while the preceding matrix selected is released.

36. In a selector mechanism, a plurality of rotatable rods, a plurality of latched selectors, a single magnet for successively operating said rods and means whereby said rods simultaneously selectively release said selectors in accordance with the operation of said rods.

37. In a selector mechanism, a plurality of rotatable rods, a plurality of selectors, spring means tending to operate said selectors, latch means individual to each of said selectors for normally preventing the operation thereof by said spring means, a single magnet for successively operating said rods and means whereby said rods simultaneously selectively operate said latch means to selectively release said selectors in accordance with the operation of said rods.

38. In a selector mechanism, a shaft, means for rotating said shaft, a plurality of rods mounted on said shaft and rotatable therewith, a plurality of latched selectors, a single magnet for successively and selectively operating said rods and means whereby said rods simultaneously and selectively release said latched selectors in accordance with the selective operation of said pins.

39. In a selector mechanism, a plurality of rotatable rods, a plurality of selectors, spring means tending to operate said selectors, latch means individual to each of said selectors for normally preventing the operation thereof by said spring means, a single magnet for successively operating said rods, means whereby said rods simultaneously selectively operate said latch means to selectively release said selectors in accordance with the operation of said rods, a pin shaft and means whereby said shaft is rotated thru varying angles and directions in accordance with the selectors operated and a plurality of devices selectively operated in accordance with the angle and direction of rotation of said pin shaft.

40. In a selector mechanism, a plurality of rotatable rods, a plurality of selectors, each having a normal non-operative position and an operative position, means whereby said selectors are normally prevented from moving to their operated positions, a single magnet for selectively operating said rods and means operative following the operation of all of said rods for permitting selective operation of said selectors to their operated positions, in accordance with the selective operation of said rods.

41. In a selector mechanism, a plurality of rotatable selectors, a plurality of second selectors, each having a normal non-operative position and an operative position, means whereby said second selectors are normally prevented from moving to their operated positions, a single magnet for selectively operating said selectors and means operative following the operation of all of said selectors for permitting the selective operation of said second selectors to their operated positions, in accordance with the selective operation of said selectors.

42. In a selector mechanism, a shaft, means for rotating said shaft, a plurality of rods mounted on said shaft and rotatable therewith, a plurality of latched selectors, a single magnet for successively and selectively operating said rods, means whereby said rods simultaneously and selectively release said latched selectors in accordance with the selective operation of said rods, a pin shaft, means whereby said shaft is rotated thru varying angles and directions in accordance with the selectors operating, and a plurality of devices selectively operated in accordance with the angle and direction of rotation of said second shaft.

43. In a selector mechanism, a first set of selectors, means for operating said selectors in accordance with received code signals, a second set of selectors, means for simultaneously transferring the selective settings of said first selectors to said second selectors, a rotatable shaft, means whereby said shaft is rotated thru varying angles in accordance with the selective operation of said second selector and a plurality of devices selected for operation in accordance with the angle of rotation of said shaft.

44. In a selector mechanism, selecting devices selectively operated in accordance with received signals, a shaft, means for rotating said shaft thru varying angles in accordance with the selection set up on said selectors and means whereby said selectors are operated in accordance with a new code while said shaft is being rotated thru a predetermined angle in accordance with a preceding code.

45. In a selector mechanism for character selection in the printing art comprising a continuously rotating selector, a plurality of selecting members movably mounted in the selector, a single magnet for controlling all of the selecting members in said selector, and means for selecting a character while said selector is being rotated for selection of another character.

46. In a selector mechanism, a continuously rotating selector having a plurality of selecting members, a single magnet responsive to code impulses for selectively operating said selecting members, a plurality of selectors disposed in the path of the selecting members operated by the magnet and adapted to be moved simultaneously by the selecting members.

47. In a selecting mechanism, a continuously rotating selector having a plurality of selecting members, single magnet means for consecutively operating said selecting members, a plurality of selectors adapted to be moved simultaneously by said selecting members, means for consecutively restoring said selecting members and means for simultaneously restoring said selectors.

48. In a selecting mechanism, a number of selecting members from which sufficient combinations may be produced to operate all characters in a character reproducing machine and having a normal position to which they tend to return, means for selectively moving said selecting members in accordance with received code impulses, a set of selectors, means for simultaneously transferring the setting on the selecting members to the selectors, means for successively restoring said selecting members to impulse receiving position after their setting has been transferred to the selectors, and spring means for operating the affected selectors.

49. In a selecting mechanism, a number of selecting members from which sufficient combinations may be produced to operate all characters in a character reproducing machine and having no normal position, means for selectively moving said selecting members in accordance with received code impulses, means for restoring said selecting members successively and a control sheet having a printed code thereon for controlling said selecting mechanism.

50. In a selecting mechanism, a plurality of selecting members having no normal position to which they tend to return, means for selectively operating said selecting members in accordance with received code impulses, a set of selectors, means for simultaneously transferring the setting on the selecting members to the selectors, means for successively restoring said selecting members to impulse receiving position after their setting has been transferred to the selectors, and spring means for operating the affected selectors.

51. In a typesetting machine having matrices, a control sheet containing a record of characters arranged to simulate line for line a desired assembly of the matrices and a selector automatically controlled by said control sheet for selecting one of said matrices in lines simulating said control record and means whereby said selected matrix is being assembled while said selector is operating under control of said record to select the next matrix to be added to the assembly.

52. In a typesetting machine having matrices, a control sheet containing a record of characters arranged to simulate line for line a desired assembly of the matrices and a selector automatically controlled by said control sheet for selecting one of said matrices to be assembled with others of said matrices in lines simulating said control record and an overlap means whereby said selected matrix is being assembled while said selector under control of said control sheet is selecting the next succeeding matrix to be added to the assembly.

53. In a typesetting machine having matrices, a control sheet containing a record of matrices arranged to simulate line for line a desired assembly of the matrices and a single magnet operated selector automatically controlled by said control sheet for selecting one of said matrices to be assembled with others of said matrices in lines simulating said control record.

54. In a typesetting machine having matrices, a control sheet containing a record of characters arranged to simulate line for line a desired assembly of the matrices and a single magnet operated selector automatically controlled by said control sheet for selecting one of said matrices to be assembled with others of said matrices in lines simulating said control record and an overlap means whereby said selected matrix is being assembled while said selector under control of said control sheet is selecting the next succeeding matrix to be added to the assembly.

55. In a typesetting machine having matrices, control mechanism, a selector operated by said control mechanism for selecting said matrices for assembly, said control device operating in advance of a complete assembly of the line for operating said selector to select all the necessary extra space in that line and an overlap means whereby said selector is selecting a matrix while the previously selected matrix is being assembled.

56. In a typesetting machine having a plurality of matrices, a single magnet controlled selector and an overlap in said selector whereby said selected matrix is released while the selector operates in accordance with the succeeding matrix selection to be made.

57. In a typesetting machine having a plurality of matrices, a single magnet controlled selector and an overlap in said selector whereby said selected matrix is released while the selector operates in accordance with the succeeding matrix selection to be made.

58. In a typesetting machine having a plurality of matrices, selector mechanism for selectively releasing said matrix, said selector including an overlap whereby said selector mechanism is operated in accordance with a new matrix selection to be made while the previously selected matrix is released.

59. In a typesetting machine having matrices, a control sheet containing printed characters and a printed code in juxtaposition therewith and a selector controlled by said code for automatically selecting said matrices, said selector having an overlap whereby it is operated under control of said code to select a new matrix while the preceding matrix is being released.

60. In a typesetting machine having matrices, a control sheet containing printed characters and a record of a corresponding code in juxtaposition, and a selector controlled by said code for automatically selecting said matrices, said selector having an overlap whereby it is operated under control of said code to select a new matrix while the preceding matrix is being released.

61. In a typesetting machine having matrices, a control sheet containing printed characters and a corresponding printed code arranged to simulate line for line a desired assembly of matrices, and a selector controlled by said code for automatically selecting said matrices, said selector having an overlap whereby it is operated under control of said code to select a new matrix while the preceding matrix is being released.

62. In a typesetting machine for matrices, a control sheet containing printed characters and a corresponding printed code arrangement to simulate line for line a desired assembly of the matrices, matrix assembly means and a selector controlled by said code for automatically selecting said matrices, said selector having an overlap whereby it is operated under control of said code to select a new matrix while the preceding matrix is being released.

63. In a typesetting machine having matrices adapted to be assembled for printing operation, a control sheet for controlling the operation of said machine, a line feed for stepping said sheet from line to line following each line assembly of matrices on said machine, and means whereby when a line on said control sheet is blotted out said line feed is automatically operated to step the sheet to a new line.

64. In a typesetting machine having matrices adapted to be assembled for printing operation, a control record for controlling the operation of said machine, a line feed for stepping said record from line to line following each line assembly of matrices on said machine, and means whereby if the first letter in said line is blotted out, said line feed is automatically operated to step the record to a new line.

65. In a machine for automatically operating a typesetting machine, a control sheet for controlling the setting of type in the typesetting machine, a carriage mechanism for holding the control sheet, scanning means for scanning the control sheet, means for oscillating said carriage mechanism transversely of its longitudinal axis and means for moving said carriage mechanism step by step along its longitudinal axis after each oscillation.

66. In a machine for automatically controlling a typesetting machine, a control sheet for controlling said typesetting machine, a carriage mechanism for holding said control sheet, means for oscillating said carriage mechanism, means for intermittently moving said carriage mechanism in a plane disposed at approximately ninety degrees from its plane of oscillation, the movement of the carriage taking place between each oscillation of the carriage.

67. In a machine for controlling the setting of type in a typesetting machine, a control sheet and a carriage mechanism for holding said control sheet, means for oscillating said carriage and said control sheet, means for moving said carriage transversely of its planes of oscillation after each oscillation and means for moving the control sheet in the carriage mechanism to new line position.

68. In a machine for controlling a typesetting machine and having carriage means for receiving and holding a control sheet, means for scanning said control sheet, means for oscillating said control sheet and carriage in one direction to cause said scanning means to scan a portion of the sheet, means for moving said carriage along its longitudinal axis, after its oscillation in one direction, means for again oscillating said carriage in a reverse direction to cause a portion parallel to the first portion scanned to be scanned by the scanning means.

69. In a machine for controlling a typesetting machine and having carriage means for receiving and holding a control sheet, means for scanning said control sheet, means for oscillating said control sheet and carriage in one direction to cause said scanning means to scan a portion of the sheet, means for moving said carriage along its longitudinal axis after its oscillation in one direction, means for again oscillating said carriage in a reverse direction to cause a portion parallel to the first portion scanned to be scanned by the scanning means and means for automatically stepping the control sheet to new line position in the carriage when the scanning operation has progressed to a blank portion on said control sheet.

70. In a machine for controlling typesetting machines and the like, a control sheet having control symbols thereon and a carriage mechanism for receiving said control sheet, means for scanning said control sheet to control the typesetting machine, said control sheet having marginal perforations along at least one edge thereof, means adapted to enter said perforations to hold the control sheet in selected position, and automatic means operable at the end of a line of symbols for removing the means from said perforations and stepping the control sheet to a new line position and again causing said means to enter a set of perforations to hold the control sheet in position while a new line is scanned by the scanning means.

71. In a machine for controlling the setting of type in typesetting machines and the like, a control sheet having code symbols thereon representing characters to be set by the typesetting machine, each of said code symbols being in the form of two lines beside each other and vertically disposed on the control sheet, means for scanning said control sheet, means for imparting oscillatory movement to the carriage in one direction and then in the other direction and means for moving the carriage along its longitudinal axis between oscillations thereof whereby the scanning means will scan both lines of symbols upon one complete oscillation of the carriage mechanism.

72. In a machine for controlling the setting of type in typesetting machines and the like, a control sheet having code symbols thereon representing characters to be set by the typesetting machine, each of said code symbols being in the form of two lines beside each other and vertically disposed on the control sheet, means for scanning said control sheet, means for imparting oscillatory movement to the carriage in one direction and then in the other direction and means for moving the carriage along its longitudinal axis between oscillations thereof whereby the scanning means will scan both lines of symbols upon one complete oscillation of the carriage mechanism, and means for automatically stepping the control sheet to new line position when a transverse line of code symbols has been scanned on the control sheet.

73. In a typesetting machine and the like, a control mechanism for selecting characters to be set by the typesetting machine and the like, a control sheet, transverse lines of code symbols on the control sheet for selecting space bands to be set by the machine, means for selecting extra spacing, and means on the control sheet for operating the control mechanism for connecting the extra spacing means to the means for selecting space bands whereby each operation of the space band mechanism will also operate the extra spacing mechanism.

74. Means for controlling typesetting machines and the like comprising a control sheet having transverse lines of printed code symbols thereon, a carriage mechanism for holding the control sheet, means for scanning said characters one after another for controlling the typesetting machine, means for returning the carriage to present a new line of code matter to the scanning means when it scans a blank area the size of a group of code symbols representing a type character and means operable by the line delivery lever at the beginning of a line preventing returning of the carriage when a blank area is located a predetermined distance from the margin of the control sheet.

75. In a machine for automatically operating a typesetting machine, a control sheet for controlling the setting of type in the typesetting machine, means for holding the control sheet, means for scanning the control sheet to selectively operate the means for automatically setting type, means for moving the control sheet back and forth relatively to the scanning mechanism, and means for moving the control sheet step by step in a direction transverse to the back and forth movement.

76. In a machine for automatically controlling the selecting of characters in a typesetting machine and the like, a control sheet having lines of control symbols thereon, means for scanning said symbols, means for holding the control sheet and reciprocating said control sheet to cause the scanning means to move transversely of the lines of symbols, and means for moving the control sheet transversely to the direction of reciprocation to cause the scanning means to successively pass over the symbols in a line.

77. In a machine for automatically controlling the selecting of characters in a typesetting machine and the like, a control sheet having lines of control symbols thereon, means for scanning said symbols, means for holding the control sheet and reciprocating said control sheet to cause the scanning means to move transversely of the lines of symbols, and means for moving the control sheet transversely to the direction of reciprocation to cause the scanning means to successively pass over the symbols in a line and means for causing relative movement between the control sheet and the holding means in the absence of a symbol in a line of symbols.

78. In a typesetting machine and the like, means for selectively controlling the setting of type in the typesetting machine and the like comprising a control sheet having parallel lines of control symbols thereon, means for successively scanning said symbols, mechanism controlled by the scanning means for selecting type characters and means operable by the scanning of a blank space on the control sheet having no symbol thereon for moving the selected type characters to another portion of the typesetting, means operable at the beginning of the scanning of a line of symbols for rendering inoperable the means for moving the selected type characters, and means for rendering inoperable the means for selectively controlling the setting of type while the selected characters are being moved to another portion of the typesetting machine.

79. In a typesetting machine and the like, a control mechanism for selecting characters to be set by the typesetting machine and the like, a control sheet, transverse lines of code symbols on the control sheet for selecting space bands to be set by the machine, means for selecting extra spacing, means on the control sheet for operating the control mechanism for connecting the extra spacing means to the means for selecting space bands whereby each operation of the space band mechanism will also operate the extra spacing mechanism, and means operable at the end of a line of symbols on the control sheet for disconnecting the extra spacing mechanism from the space band mechanism.

80. A control sheet for selectively controlling a plurality of work-performing instrumentalities and means for holding the control sheet, said control sheet having parallel lines of code symbols thereon, means for successively scanning said symbols, means for causing relative movement between the scanning means and a line of symbols transversely of the line of symbols and means for causing relative movement between the scanning means and the control sheet longitudinally of the lines of symbols.

81. In a typesetting machine having key rod lifters for space bands and extra spaces, individually operated means for raising the key rod lifters, a control sheet for selecting for operation the means for raising the key rod lifters, mechanical means operable at the beginning of a line for selectively connecting two of the means for raising the key rod lifters together during the setting of a line so that each operation of one of the means will also operate other means, and means on the control sheet for controlling the mechanical means.

82. In a typesetting machine having individually operable means for releasing the characters, space bands, and extra spacing, and selectively operated means for mechanically connecting the extra spacing releasing means to the space band releasing means so that releasing of a space band will also release an extra spacing, and a control sheet having a control character thereon for controlling the operation of the selectively operated means.

83. A selecting mechanism controlled by a plurality of electrical impulses for selecting one of a plurality of work-performing instrumentalities one at a time, comprising a first selector having a plurality of movable selector rods, a second selector having a plurality of movable selector bars actuated by the first selector, a third selector actuated by the second selector and cam means for returning the three selectors to normal position after they have been actuated.

84. In a typesetting machine and the like, a control mechanism for selecting characters to be set by the typesetting machine and the like, a control sheet, transverse lines of code symbols on the control sheet for selecting space bands to be set by the machine, means for selecting extra spacing, and means on the control sheet for operating the control mechanism to actuate simultaneously the means for selecting the space bands and the means for selecting extra spacing.

85. Means for automatically setting type in a typesetting machine, comprising a mechanism adapted to be attached to the typesetting machine and having means therein for independently and selectively lifting the key rods of the typesetting machine, elevating means for the lifters, a pair of oscillatable shafts in said mechanism, each shaft having a plurality of transversely disposed pins slidably mounted therein, a plurality of slidable means disposed between the two shafts, means for moving a selected pin in one shaft to move one of the slidable means to cause it to engage the selected pin in the other shaft, the second pin being adapted to push a key rod lifter into the path of the elevating means, a selector mechanism for selectively oscillating said shafts, and means controlling the selector mechanism.

86. In a character reproducing machine, a printed control sheet having a plurality of transverse lines of code characters thereon, a photoelectric cell mechanism for scanning said code characters on said control sheet, means controlled by said scanning operation for reproducing the selected characters in the character reproducing machine, means for stepping the control sheet from line to line and means controlled by said control sheet whereby when the first character in a line is blotted out the control sheet will be moved to new line position.

87. In a character reproducing machine, having characters adapted to be selected for a printing operation, a control record having parallel lines of control characters thereon for controlling the operation of said machine, means for scanning the control record, a line feed for stepping the record from line to line, and means whereby if the first character in a line on said record is blotted out, said line feed is automatically operated to step the control record to new line position without passing the scanning means over the line whose first character is blotted out.

88. In a character reproducing machine, a control record for said machine, means for scanning said control record, said control record having the characters thereon arranged in lines, means for holding the control record, means for stepping the control record from one line to another and means operable to step the control record to new line position when the first character in a line on said record is blotted out.

89. In a linecasting machine having a line delivery lever, a control record having control characters thereon arranged in lines for selecting characters to be reproduced by the linecasting machine, means for scanning said control record, means for stepping the control record from line to line, means operable upon scanning of a blank space on the record for stepping the control record to new line position, and means operable by the line delivery lever in advance of a line for rendering inoperative the means for stepping the control record to new line position.

90. Means for reproducing printed characters comprising a reproducing machine, a control record having control characters thereon arranged in lines, means for scanning the characters line for line, means for stepping the control record to newline position upon scanning a portion of the record having no character thereon, means for causing the scanning to begin slightly in advance of the beginning of the lines, and means for preventing movement of the control record to new line position while the scanning in advance of the beginning of a line takes place.

91. In a selector mechanism for selecting and reproducing printed characters, a rotary member having a plurality of rods slidably mounted therein, means normally holding said rods against movement, a control record, electric impulse means for scanning said control record for selective operation of said selector mechanism, a spring pressed cam normally riding over the ends of said rods as said rotary member rotates, and means controlled by said control record for locking said cam to move a selected rod in said selecting mechanism.

92. In a typesetting machine having individually operable means for releasing the characters, space bands, an extra spacing, and selectively operated means for connecting the extra spacing releasing means to the space band releasing means at the beginning of a line so that releasing of space bands throughout the line will also release an extra spacing.

93. In a linecasting machine, typesetting machine and the like, means for selecting characters in said machine for reproduction, comprising a control record, means for scanning the control record, a shift mechanism, means controlled by the control record for locking the shift mechanism in position to select a high case character and automatic means for unlocking the shift mechanism and returning it to normal position to select a low case character before the next character is selected.

94. Means for actuating linecasting machines, typesetting machines and the like comprising a control record, means for scanning the control record, means controlled by the scanning for selecting upper case and lower case characters, means for locking the upper case selecting means in operable position and locking the lower case in inoperative position, and automatic means for unlocking lower case and locking the upper case selecting means after an upper case character has been selected and before the next character has been fully selected.

95. In a linecasting machine having a matrix assembling mechanism, means for raising the assembler, a selector mechanism, a control record for controlling the selector, a plurality of key rod lifters under the control of the selector and a striking bail for raising the selected key rod lifter.

96. In a linecasting machine having a matrix assembling mechanism, means for raising the assembler, a selector mechanism, a control record for controlling the selector, a plurality of key rod lifters under the control of the selector and means for holding a selected key rod in raised position while the selecting mechanism returns to normal position.

97. Means associated with a character reproducing machine comprising a light sensitive cell, a control sheet, means for receiving the control sheet and moving said control sheet with respect to the light sensitive cell, means for focusing a light on said control sheet to cause the beam of light to pass over said control sheet and to affect said light sensitive cell, said control sheet having a plurality of code characters thereon, at least one of said code characters comprising a plurality of cell controls, means for causing the beam of light to pass successively over the cell controls of the code characters to impinge on the light sensitive cell and means operable by said light sensitive cell for selectively operating the character reproducing members in the character reproducing machine, said control sheet having thereon code characters for determining the case of the character to be reproduced by the character reproducing machine.

98. In character reproducing machines having character reproducing members, means for operating the same comprising a control sheet having a plurality of transverse lines thereon, a photo-electric cell mechanism for scanning said control sheet, means controlled by said scanning operation for reproducing the selected characters in the reproducing machine, means for stepping the control sheet from line to line and means controlled by said control sheet whereby when the first character in a line is blotted out the control sheet will be moved to new line position without causing the scanning means to pass over the line whose first character is blotted out.

99. In a machine for automatically reproducing characters, a control sheet for controlling the actuation of the character bearing members in said machine, a carriage mechanism for holding the control sheet, scanning means for scanning the control sheet, means for oscillating said carriage mechanism transversely of its longitudinal axis and means for moving said carriage mechanism step by step along its longitudinal axis after each oscillation.

100. In a machine for reproducing characters, a control sheet and a carriage mechanism for holding said control sheet, means for oscillating said carriage mechanism with its control sheet, means for moving said carriage mechanism transversely of its plane of oscillation after each oscillation and means for moving the control sheet in the carriage mechanism to new line position.

101. In a machine for controlling a character reproducing machine and having carriage means for receiving and holding a control sheet, means for scanning said control sheet, means for oscillating said carriage mechanism with its control sheet in one direction to cause said scanning means to scan a portion of a sheet, means for moving said carriage along its longitudinal axis after its oscillation in one direction, means for again moving said carriage in a reverse direction to cause a portion parallel to the first portion scanned to be scanned by the scanning means.

102. In a machine for reproducing characters and having a carriage means for receiving and holding a control sheet, means for scanning said control sheet, means for oscillating said control sheet and carriage in one direction to cause said scanning means to scan a portion of the sheet, means for moving said carriage along its longitudinal axis after its oscillation in one direction, means for again oscillating said carriage in reverse direction to cause a portion parallel to the first portion scanned to be scanned by the scanning means and means for automatically stepping the control sheet to new line position in the carriage when the scanning operation has progressed to a blank portion on said control sheet.

103. In a machine for controlling a character reproducing machine, a control sheet having code symbols thereon representing characters to be reproduced by the character reproducing machine, each of said code symbols being in the form of two lines beside each other and vertically disposed on the control sheet, means for scanning said control sheet, means for imparting oscillatory movement to the carriage in one direction and then in another direction and means for moving the carriage along its longitudinal axis between oscillations thereof whereby the scanning means will scan both lines of symbols upon a complete oscillation of the carriage mechanism.

104. A selecting mechanism for a character reproducing machine, comprising a pair of rotatable shafts, radially disposed pins slidably penetrating said shafts, a character actuating member adapted to be engaged by one end of the pins in one shaft, a striking bail adapted to engage one end of the pins in the other shaft, slidable means disposed between the shafts so that movement of a pin in said other shaft will engage said slidable means between the shafts and move a pin in said first shaft to move a character actuating member, a control means for rotating said shafts to select the desired pins to actuate the desired character.

105. A selecting mechanism for a character reproducing machine, a plurality of slidable pins, means for supporting the pins, means for moving said supporting means, a striking bail for moving one pin at a time, character selecting means engageable by a pin moved by the striking bail, and means engaging the character selecting means and selecting the character.

106. In a selecting mechanism for selecting the characters for actuation in a character reproducing machine, a plurality of slidable pins, control means for positioning said pins, a pair of striking bails for engaging said pins for actuating lower case and high case characters, and means for locking one of the striking bails normally out of operation, and means controlled by the control means for releasing the locked striking bail for operation and locking the other striking bail against operation.

107. A selecting mechanism comprising a pair of rotatable shafts, a plurality of slidable pins radially disposed in said shafts, the outer ends of said pins projecting beyond the exterior of the shaft and defining a spirally disposed outline, control means for rotating said shafts to position a pin in each shaft with a pin in the other shaft, a striking bail for striking one of the pins in one shaft and work performing instrumentalities disposed in the path of one end of the pins in the other shaft so that actuation of the striking bail will move one pin in each of the shafts and actuate a work performing instrumentality.

108. A selecting mechanism comprising a pair of members, a plurality of pins slidably penetrating each of said members, a plurality of work performing instrumentalities in close proximity to one of the pins in one member, a striking bail for engaging the end of the pins in the other member, control means for moving said members to position a selected pin in each shaft to selectively actuate a work performing instrumentality.

109. A control sheet adapted to be placed in a mechanism associated with a character reproducing machine, said control sheet having thereon both legible characters and code characters associated with each legible character, a photoelectric means for successively scanning the code characters associated with each legible character to selectively operate the character reproducing means in the character reproducing machine, and a code character preceding some of said code characters for actuating the shift mechanism of the character reproducing machine.

110. In a selective mechanism for selective operation of a plurality of work performing instrumentalities, comprising a pair of spaced oscillating shafts, each of said shafts having a plurality of radially disposed pins slidably penetrating the same, slidable members disposed between the shafts, a striking bail for engaging a pin in one portion of one shaft to move the slidable member and a coinciding pin in the other shaft, a second striking bail for engaging the pins in the other portion of said one shaft to similarly operate a slidable member and pin in the other portions of said other shaft, electric impulse means for controlling the oscillation of said shafts.

111. In a selecting mechanism for selective operation of a plurality of work performing instrumentalities, comprising a pair of spaced oscillatable shafts, each of said shafts having a plurality of radially disposed pins slidably penetrating the same and projecting outwardly from the periphery of the shaft with the angles of mounting of the pins differing from each other, slidable members disposed between the shafts, a striking bail for engaging a pin in one portion of one shaft to move the slidable member and a coinciding pin in the other shaft to select a work performing instrumentality and means controlled by a plurality of electrical impulses for selectively positioning both of said shafts.

112. A selecting mechanism for selecting work-performing instrumentalities for operation comprising a first selector, electrical impulse means for operating the first selector, a second selector movable by the selections made in the first selector, a pair of third selectors movable in two directions by the second selector and means controlled by the first selector for determining the direction of movement and amount of movement of the third selector.

113. In a selecting mechanism for selecting characters in reproducing machines such as linecasting machines, and the like, a pair of oscillatable shafts having a plurality of radially disposed pins slidably penetrating the same, said shafts being divided into upper case sections and lower case sections, electric impulse operated means for selectively oscillating said shafts to cause a pin in one shaft to coincide with a pin in the other shaft, a striking bail for striking one pin to move the other pin to actuate a type character and the like.

BUFORD L. GREEN.